United States Patent
Tsuchihashi et al.

(10) Patent No.: US 6,285,436 B1
(45) Date of Patent: *Sep. 4, 2001

(54) IMAGE READING SYSTEM FOR OBTAINING A FINAL IMAGE BY DISPLAYING A PLURALITY OF PRELIMINARY IMAGES READ UNDER VARIOUS READING CONDITIONS

(75) Inventors: Hidehisa Tsuchihashi, Tokyo; Tadashi Ohta; Takuya Shirahata, both of Yokohama, all of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/388,377

(22) Filed: Sep. 1, 1999

Related U.S. Application Data

(63) Continuation of application No. 08/949,689, filed on Oct. 14, 1997, now abandoned.
(60) Provisional application No. 60/044,592, filed on Apr. 22, 1997.

(30) Foreign Application Priority Data

Oct. 11, 1996 (JP) .................................................. 8-269874
Apr. 1, 1997 (JP) .................................................. 9-083033

(51) Int. Cl.$^7$ .............................. G03B 27/52; H04N 1/54
(52) U.S. Cl. ............................... 355/40; 355/41; 358/497
(58) Field of Search ........................... 355/27–29, 40–43, 355/50; 358/450, 452–453, 448, 497; 348/572; 399/39; 382/168, 171

(56) References Cited

U.S. PATENT DOCUMENTS

| | | | | |
|---|---|---|---|---|
| 5,133,025 | * | 7/1992 | Koyama et al. | 382/46 |
| 5,157,518 | * | 10/1992 | Ohtaki et al. | 358/461 |
| 5,225,914 | * | 7/1993 | Saito | 358/404 |
| 5,289,270 | * | 2/1994 | Hayashi | 358/512 |
| 5,365,352 | * | 11/1994 | Tajima | 358/500 |
| 5,444,550 | * | 8/1995 | Enokida et al. | 358/458 |
| 5,566,372 | * | 10/1996 | Ikeda et al. | 355/208 |
| 5,570,206 | * | 10/1996 | Yoshinaga | 358/497 |
| 5,751,451 | * | 5/1998 | Ogoshi et al. | 358/527 |
| 5,784,074 | * | 7/1998 | Okawa | 345/515 |

OTHER PUBLICATIONS

U.S. application No. 08/949,689, Tsuchihashi et al., filed Oct. 1997.

* cited by examiner

Primary Examiner—Russell Adams
Assistant Examiner—Hung Henry Nguyen

(57) ABSTRACT

An image reading system to easily obtain a desired final image by displaying a plurality of images read under various image reading conditions for a direct comparison, and an image reading apparatus to output image data read under the various reading conditions with a single reading operation, and a memory medium to store the control procedures thereof. The image reading system includes an image reading device to read the image of a document by dividing the image into a plurality of areas and to output image signals corresponding to the plurality of areas. A reading condition input device sets a first and a second reading condition under which the image is read. An image processing device converts the image signal corresponding to a first area, among the plurality of areas, into a first image signal based on the first image reading condition, and converts the image signal corresponding to a second area into a second image reading based on the second image reading condition. A display then displays respective images according to the first and second image signals.

36 Claims, 15 Drawing Sheets

FIG. I

PIXEL

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | A | a | a | a | A | a | a | a | A | a | a | a | A | a | a | a |
| 2 | b | B | b | b | b | B | b | b | b | B | b | b | b | B | b | b |
| 3 | c | c | C | c | c | c | C | c | c | c | C | c | c | c | C | c |
| 4 | d | d | d | D | d | d | d | D | d | d | d | D | d | d | d | D |
| 5 | A | a | a | a | A | a | a | a | A | a | a | a | A | a | a | a |
| 6 | b | B | b | b | b | B | b | b | b | B | b | b | b | B | b | b |
| 7 | c | c | C | c | c | c | C | c | c | c | C | c | c | c | C | c |
| 8 | d | d | d | D | d | d | d | D | d | d | d | D | d | d | d | D |
| 9 | A | a | a | a | A | a | a | a | A | a | a | a | A | a | a | a |
| 10 | b | B | b | b | b | B | b | b | b | B | b | b | b | B | b | b |
| 11 | c | c | C | c | c | c | C | c | c | c | C | c | c | c | C | c |
| 12 | d | d | d | D | d | d | d | D | d | d | d | D | d | d | d | D |
| 13 | A | a | a | a | A | a | a | a | A | a | a | a | A | a | a | a |
| 14 | b | B | b | b | b | B | b | b | b | B | b | b | b | B | b | b |
| 15 | c | c | C | c | c | c | C | c | c | c | C | c | c | c | C | c |
| 16 | d | d | d | D | d | d | d | D | d | d | d | D | d | d | d | D |

LINE

A : READS UNDER CONDITION A. USED AS OUTPUT DATA
a : READS UNDER CONDITION A. NOT USED AS OUTPUT DATA
B : READS UNDER CONDITION B. USED AS OUTPUT DATA
b : READS UNDER CONDITION B. NOT USED AS OUTPUT DATA
C : READS UNDER CONDITION C. USED AS OUTPUT DATA
c : READS UNDER CONDITION C. NOT USED AS OUTPUT DATA
D : READS UNDER CONDITION D. USED AS OUTPUT DATA
d: READS UNDER CONDITION D. NOT USED AS OUTPUT DATA

FIG. 7

PIXEL

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | a | a | a | A | a | a | a | A | a | a | a | A | a | a | a |
| 2 | B | b | b | b | B | b | b | b | B | b | b | b | B | b | b | b |
| 3 | C | c | c | c | C | c | c | c | C | c | c | c | C | c | c | c |
| 4 | D | d | d | d | D | d | d | d | D | d | d | d | D | d | d | d |
| 5 | A | a | a | a | A | a | a | a | A | a | a | a | A | a | a | a |
| 6 | B | b | b | b | B | b | b | b | B | b | b | b | B | b | b | b |
| 7 | C | c | c | c | C | c | c | c | C | c | c | c | C | c | c | c |
| 8 | D | d | d | d | D | d | d | d | D | d | d | d | D | d | d | d |
| 9 | A | a | a | a | A | a | a | a | A | a | a | a | A | a | a | a |
| 10 | B | b | b | b | B | b | b | b | B | b | b | b | B | b | b | b |
| 11 | C | c | c | c | C | c | c | c | C | c | c | c | C | c | c | c |
| 12 | D | d | d | d | D | d | d | d | D | d | d | d | D | d | d | d |
| 13 | A | a | a | a | A | a | a | a | A | a | a | a | A | a | a | a |
| 14 | B | b | b | b | B | b | b | b | B | b | b | b | B | b | b | b |
| 15 | C | c | c | c | C | c | c | c | C | c | c | c | C | c | c | c |
| 16 | D | d | d | d | D | d | d | d | D | d | d | d | D | d | d | d |

LINE

A : READS UNDER CONDITION A. USED AS OUTPUT DATA
a : READS UNDER CONDITION A. NOT USED AS OUTPUT DATA
B : READS UNDER CONDITION B. USED AS OUTPUT DATA
b : READS UNDER CONDITION B. NOT USED AS OUTPUT DATA
C : READS UNDER CONDITION C. USED AS OUTPUT DATA
c : READS UNDER CONDITION C. NOT USED AS OUTPUT DATA
D : READS UNDER CONDITION D. USED AS OUTPUT DATA
d: READS UNDER CONDITION D. NOT USED AS OUTPUT DATA

FIG. 8

| A A A A |
| A A A A |
| A A A A |
| A A A A |

PRELIMINARY IMAGE DATA
UNDER CONDITION A

FIG. 9A

| B B B B |
| B B B B |
| B B B B |
| B B B B |

PRELIMINARY IMAGE DATA
UNDER CONDITION B

FIG. 9B

| C C C C |
| C C C C |
| C C C C |
| C C C C |

PRELIMINARY IMAGE DATA
UNDER CONDITION C

FIG. 9C

| D D D D |
| D D D D |
| D D D D |
| D D D D |

PRELIMINARY IMAGE DATA
UNDER CONDITION D

FIG. 9D

PIXEL

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | a | a | a | A | a | a | a | A | a | a | a | A | a | a | a |
| 2 | b | B | b | b | b | B | b | b | b | B | b | b | b | B | b | b |
| 3 | c | c | C | c | c | c | C | c | c | c | C | c | c | c | C | c |
| 4 | d | d | d | D | d | d | d | D | d | d | d | D | d | d | d | D |
| 5 | A | a | a | a | A | a | a | a | A | a | a | a | A | a | a | a |
| 6 | b | B | b | b | b | B | b | b | b | B | b | b | b | B | b | b |
| 7 | c | c | C | c | c | c | C | c | c | c | C | c | c | c | C | c |
| 8 | d | d | d | D | d | d | d | D | d | d | d | D | d | d | d | D |
| 9 | A | a | a | a | A | a | a | a | A | a | a | a | A | a | a | a |
| 10 | b | B | b | b | b | B | b | b | b | B | b | b | b | B | b | b |
| 11 | c | c | C | c | c | c | C | c | c | c | C | c | c | c | C | c |
| 12 | d | d | d | D | d | d | d | D | d | d | d | D | d | d | d | D |
| 13 | A | a | a | a | A | a | a | a | A | a | a | a | A | a | a | a |
| 14 | b | B | b | b | b | B | b | b | b | B | b | b | b | B | b | b |
| 15 | c | c | C | c | c | c | C | c | c | c | C | c | c | c | C | c |
| 16 | d | d | d | D | d | d | d | D | d | d | d | D | d | d | d | D |

LINE

A : PIXEL THAT IS READ UNDER CONDITION A. USED AS PRELIMINARY IMAGE DATA.

a : PIXEL THAT IS READ UNDER CONDITION A. NOT USED AS PRELIMINARY IMAGE DATA.

B: PIXEL THAT IS READ UNDER CONDITION B. USED AS PRELIMINARY IMAGE DATA.

b: PIXEL THAT IS READ UNDER CONDITION B. NOT USED AS PRELIMINARY IMAGE DATA.

C : PIXEL THAT IS READ UNDER CONDITION C. USED AS PRELIMINARY IMAGE DATA.

c : PIXEL THAT IS READ UNDER CONDITION C. NOT USED AS PRELIMINARY IMAGE DATA.

D : PIXEL THAT IS READ UNDER CONDITION D. USED AS PRELIMINARY IMAGE DATA.

d : PIXEL THAT IS READ UNDER CONDITION D. NOT USED AS PRELIMINARY IMAGE DATA.

FIG. 10

PIXEL

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | A | a | a | a | A | a | a | a | A | a | a | a | A | a | a | a |
| 2 | B | b | b | b | B | b | b | b | B | b | b | b | B | b | b | b |
| 3 | C | c | c | c | C | c | c | c | C | c | c | c | C | c | c | c |
| 4 | D | d | d | d | D | d | d | d | D | d | d | d | D | d | d | d |
| 5 | A | a | a | a | A | a | a | a | A | a | a | a | A | a | a | a |
| 6 | B | b | b | b | B | b | b | b | B | b | b | b | B | b | b | b |
| 7 | C | c | c | c | C | c | c | c | C | c | c | c | C | c | c | c |
| 8 | D | d | d | d | D | d | d | d | D | d | d | d | D | d | d | d |
| 9 | A | a | a | a | A | a | a | a | A | a | a | a | A | a | a | a |
| 10 | B | b | b | b | B | b | b | b | B | b | b | b | B | b | b | b |
| 11 | C | c | c | c | C | c | c | c | C | c | c | c | C | c | c | c |
| 12 | D | d | d | d | D | d | d | d | D | d | d | d | D | d | d | d |
| 13 | A | a | a | a | A | a | a | a | A | a | a | a | A | a | a | a |
| 14 | B | b | b | b | B | b | b | b | B | b | b | b | B | b | b | b |
| 15 | C | c | c | c | C | c | c | c | C | c | c | c | C | c | c | c |
| 16 | D | d | d | d | D | d | d | d | D | d | d | d | D | d | d | d |

LINE

A : PIXEL THAT IS READ UNDER CONDITION A. USED AS PRELIMINARY IMAGE DATA.

a : PIXEL THAT IS READ UNDER CONDITION A. NOT USED AS PRELIMINARY IMAGE DATA.

B: PIXEL THAT IS READ UNDER CONDITION B. USED AS PRELIMINARY IMAGE DATA.

b: PIXEL THAT IS READ UNDER CONDITION B. NOT USED AS PRELIMINARY IMAGE DATA.

C : PIXEL THAT IS READ UNDER CONDITION C. USED AS PRELIMINARY IMAGE DATA.

c : PIXEL THAT IS READ UNDER CONDITION C. NOT USED AS PRELIMINARY IMAGE DATA.

D : PIXEL THAT IS READ UNDER CONDITION D. USED AS PRELIMINARY IMAGE DATA.

d : PIXEL THAT IS READ UNDER CONDITION D. NOT USED AS PRELIMINARY IMAGE DATA.

FIG. 11

IMAGE READING SYSTEM FOR OBTAINING A FINAL IMAGE BY DISPLAYING A PLURALITY OF PRELIMINARY IMAGES READ UNDER VARIOUS READING CONDITIONS

CROSS-REFERENCE TO RELATED APPLICATIONS

This application is a Continuation of application Ser. No. 08/949,689, filed Oct. 14, 1997 now abandoned.

This application is based upon and claims priority of U.S. Patent Application No. 60/ 044,592 filed Apr. 22, 1997, the contents of which are incorporated herein by reference, and is also based upon Japanese Patent Application No. 8-101081 filed Apr. 23, 1996.

BACKGROUND OF THE INVENTION

1. Field of the Invention

The present invention relates to an image reading system for easily obtaining a desired final image by preliminarily displaying an image read by an image reading device under various image reading conditions, and obtaining a final image after determining final reading conditions by referring to the preliminary image read under the various reading conditions. The present invention also relates to an image reading apparatus to read the images according to a reading condition, and a memory medium to store control procedures for reading the image.

2. Description of the Related Art

A film scanner is a known type of image reading apparatus for reading an image photographed by a camera and reproduced on film. The film scanner reads an image on the film negative, or reversal film, in accordance with instructions from a host computer serving as a control device, and outputs the image read from the film negative to the host computer. The host computer displays a frame image of the film on a monitor screen.

An image reading system normally comprises an image reading apparatus and a host computer. Further, it is known to configure the image reading apparatus and the host computer in a single enclosure. A conventional image reading apparatus includes a line sensor to read an image, and employs either a penetration method to provide the line sensor with light penetrated through the film document, or a reflection method to provide the line sensor with light reflected from the film document. Further, it is also well known that, in terms of the positional relationship between the line sensor and the film document, the film document may be moved with respect to the line sensor, or otherwise.

The conventional line sensor includes an image accumulation section consisting of multiple photoelectric conversion sections arranged in a row, and a transfer section to transfer electric charge accumulated in each image accumulation section. To read information, the line sensor starts scanning sequentially in a lengthwise direction from one end to the other end, and sends the information thus read externally by transferring the electrical charge accumulated in each image accumulation section to the transfer section. An image reading scan is referred to as a main scanning and the direction of the image reading scan is referred to as the main scanning direction. A two-dimensional image in an image memory area of the film is read by moving the film document and line sensor relative to each other in a secondary scanning direction crossing the main scanning direction.

With a conventional image reading system, a final output image is obtained by performing the following steps. Initially, an image read under certain conditions is displayed preliminarily on the monitor screen. Next, a user conceptualizes, in his/her own mind, a final image that he/she would like to achieve by viewing the preliminarily displayed image. After conceptualizing a final image, the user enters modified reading conditions with modified gradation characteristics and color balance. Then, the final output image is read under the modified reading conditions. At this time, the final output image, which is obtained under the above-described modified reading conditions, is simulated for the display through image processing to provide convenience for the user.

However, since the conventional image reading system, requires the user to conceptualize the final image to be achieved to set the reading conditions, the image simulated based on the set conditions often has unsatisfactory results. In that case, it is necessary to search the reading conditions for an image the user wants to ultimately achieve by repeatedly setting the reading conditions and displaying the simulated images until a satisfactory result is obtained. Therefore, the image reading process with the conventional image reading system involves very complicated reading operations if the above-described procedures must be repeated more than once.

SUMMARY OF THE INVENTION

It is an object of the present invention to eliminate the above-described problems of the conventional image reading system, and to provide an image reading system for easily obtaining a desired final image by displaying a plurality of preliminary images read under various image reading conditions to allow a direct comparison of the plurality of images.

It is another object of the present invention to provide an image reading system to output image data read under a variety of image reading conditions with a single image reading operation.

It is another object of the present invention to provide a memory medium to store control procedures for performing an image reading operation.

Objects and advantages of the present invention are attained in accordance with embodiments of the present invention with an image reading system comprising an image reading device to read an image on a document by dividing the image into a plurality of areas and to output image signals corresponding to the plurality of areas; a reading condition input device to set a first image reading condition and a second image reading condition; an image processing device to convert an image signal corresponding to a first area of the image into a first image signal based on the first image reading condition and to convert an image signal corresponding to a second area into a second image signal based on the second image reading condition; and a display device to display respective images based on the first image signal and the second image signal.

In accordance with embodiments of the present invention, the image reading device comprises a line sensor having a plurality of photoelectric conversion sections arranged in a row in a main scanning direction; a moving device to move the line sensor and the document relative to each other in a secondary scanning direction crossing the main scanning direction, wherein the image of the document is divided into a plurality of areas to be read in the main scanning direction by the plurality of photoelectric conversion sections, and in the secondary scanning direction by the moving device in a sequential manner.

In accordance with embodiments of the present invention, the first area comprises a plurality of reading areas of the main scanning direction extracted at specified intervals in the secondary scanning direction, and the second area is different from the first area, and comprises a plurality of reading areas of the main scanning direction extracted at a specified interval in the secondary scanning direction.

In accordance with embodiments of the present invention, the first area further comprises pixels arranged at a specified interval in the main scanning direction of the line sensor.

In accordance with embodiments of the present invention, the specified interval in the main scanning direction of the line sensor is almost equal to the specified interval in the secondary scanning direction.

In accordance with embodiments of the present invention, the image reading device comprises an area sensor having a plurality of photoelectric conversion sections arranged in rows and columns, and the image of the document is read by dividing the document into a plurality of areas corresponding to the plurality of photoelectric conversion sections.

In accordance with embodiments of the present invention, the first area comprises rows of reading areas extracted at specified intervals of the plurality of photoelectric conversion sections arranged in the rows and columns, and the second area is different from the first area, and comprises rows of reading areas extracted at specified intervals of the plurality of photoelectric conversion sections arranged in the rows and columns.

In accordance with embodiments of the present invention, the image processing device is a gradation conversion process device to convert a gradation based on the first image reading condition or the second image reading condition.

In accordance with embodiments of the present invention, the gradation conversion process device comprises a memory to store a plurality of gamma values, and the gradation conversion process device performs a conversion process for the first image reading condition by reading a first gamma value from the memory, and performs a conversion process for the second image reading condition by reading a second gamma value from the memory.

In accordance with the embodiments of the present invention, the gradation conversion process device comprises a memory to store a plurality of contrast characteristic values, and the gradation conversion process device performs a conversion process for the first image reading condition by reading a first contrast characteristic value from the memory and performs a conversion process for the second image reading condition by reading a second contrast characteristic value from the memory.

In accordance with embodiments of the present invention, the image reading device comprises an amplifying device to amplify the image signal that has been read, and the gradation conversion control device drives the amplifying device at a first amplification level based on the first image reading condition, and drives the amplifying device at a second amplification level based on the second image reading condition.

In accordance with embodiments of the present invention, the image reading device comprises a color separation device to separate colors in the image of the document, and the image processing device performs a color balancing process, based on the first image reading condition and the second image reading condition, for the image signals output by the image reading device corresponding to the image for which colors have been separated by the color separation device.

In accordance with embodiments of the present invention, the display device comprises a display control to display images, side by side, based on the first image signal and the second image signal.

In accordance with embodiments of the present invention, the display interchangeably displays images based on the first and second image signals.

Objects and advantages of the present invention are attained in accordance with another embodiment of the present invention with an image reading system comprising an image reading device to read an image of a document by dividing the document into a plurality of areas and to output image signals corresponding to the plurality of areas; a reading condition input device to set a first image reading condition and a second image reading condition for reading the images; a control device to drive the image reading device based on the first image reading condition to output a first image signal corresponding to a first area among the plurality of areas and to drive the image reading device based on the second image reading condition to output a second image signal corresponding to a second area among the plurality of areas; and a display device to display the images based on the first and second image signals respectively.

In accordance with embodiments of the present invention, the image reading device comprises a line sensor including a plurality of photoelectric conversion sections arranged in a row in a main scanning direction; and a moving device to move the line sensor and the document relative to each other in a secondary scanning direction crossing the main scanning direction, wherein the image reading device reads the image of the document by dividing the document into a plurality of areas through the main scanning process by the plurality of photoelectric conversion sections and the secondary scanning by the moving device in a sequential manner.

In accordance with embodiments of the present invention, the first area comprises a plurality of reading areas in the main scanning direction extracted at specified intervals in the secondary scanning direction, and the second area is different from the first area and comprises a plurality of reading areas in the main scanning direction extracted at specified intervals in the secondary scanning direction.

In accordance with embodiments of the present invention, the first area further comprises pixels arranged at specified intervals in the main scanning direction of the line sensor.

In accordance with embodiments of the present invention, the specified intervals in the main scanning direction of the line sensor are almost equal to the specified intervals in the secondary scanning direction.

In accordance with embodiments of the present invention, the control device comprises a gradation conversion control device to control the conversion of gradations based on the first image reading condition or the second image reading condition.

In accordance with embodiments of the present invention, the image reading device comprises a line sensor including a plurality of photoelectric conversion sections arranged in a row in a main scanning direction; and a moving device to move the line sensor and the document relative to each other in a secondary scanning direction crossing the main scanning direction, and the gradation conversion control device drives the plurality of photoelectric conversion sections at a first image accumulation time based on the first image reading condition, and drives the plurality of photoelectric conversion sections at a second image accumulation time based on the second image reading condition.

In accordance with embodiments of the present invention, the image reading device comprises a lighting device to light the document, and the gradation conversion control device drives the lighting device at a first lighting time based on the first image reading condition, and drives the lighting device at a second lighting time based on the second image reading condition.

In accordance with embodiments of the present invention, the image reading device is an area sensor having a plurality of photoelectric conversion sections arranged in rows and columns, and the image reading device reads the image of the document by dividing the document into a plurality of areas corresponding to the plurality of photoelectric conversion sections.

In accordance with embodiments of the present invention, the first area comprises rows of reading areas extracted at specified intervals in the plurality of photoelectric conversion sections arranged in the rows and columns, and the second area is different from the first area and comprises rows of reading areas extracted at specified intervals in the plurality of photoelectric conversion sections arranged in the rows and columns.

In accordance with embodiments of the present invention, the image reading device comprises a color separation device to separate colors in the image of the document, and the control device controls color balancing based on the first image reading condition and the second image reading condition.

In accordance with embodiments of the present invention, the display device includes a display control device to display, side by side, images based on the first and second image signals.

In accordance with embodiments of the present invention, the display device includes a display control device to interchangeably display the images based on the first and second image signals.

Objects and advantages of the present invention are attained in accordance with another embodiment of the present invention with an image reading system comprising an image reading device to read an image on a document by dividing the document into a plurality of areas and to output image signals corresponding to the plurality of areas; a reading condition input device to set a first image reading condition and a second image reading condition; an image processing device to convert an image signal corresponding to a specified area into a first image signal based on the first image reading condition and to convert an image signal corresponding to the specified area into a second image signal based on the second image reading condition; and a display device to display, side by side, images based on the first image reading signal and the second image reading signal.

Objects and advantages of the present invention are achieved in accordance with another embodiment of the present invention with an image reading apparatus comprising an image reading device to read images on a document by dividing the document into a plurality of areas and to output image signals corresponding to the plurality of areas; a reading condition input device to set a first image reading condition and a second image reading condition; an image processing device to convert an image signal corresponding to a first area into a first image signal based on the first image reading condition, and to convert an image signal corresponding to a second area into a second image signal based on the second image reading condition; and an output device to output the first and second image signals to external devices.

Objects and advantages of the present invention are achieved in accordance with another embodiment of the present invention with an image reading apparatus comprising an image reading device to read an image on a document by dividing the image into a plurality of areas and to output image signals corresponding to the plurality of areas; a reading condition input device to set a first image reading condition or a second image reading condition; a control device to control the image reading device based on the first image reading condition to output a first image signal corresponding to a first area among the plurality of areas and to control the image reading device based on the second image reading condition to output a second image signal corresponding to a second area among the plurality of areas; and an output device to output images, based on the first and second image signals, to external devices.

Objects and advantages of the present invention are achieved in accordance with another embodiment of the present invention with a memory system for an image reading system comprising an image reading device to read an image on a document by dividing the image into a plurality of areas and to output image signals corresponding to the plurality of areas; a reading condition input device to set a first image reading condition and a second image reading condition; and a memory medium to store control procedures for the image reading system, including an image processing procedure to convert an image signal corresponding to a first area, among the plurality of areas, into a first image signal based on the first image reading condition and to convert an image signal corresponding to a second area into a second image signal based on the second image reading condition, and to store display procedures to display images based on the first and second image signals.

In accordance with embodiments of the present invention, the image reading device of the memory system comprises a line sensor including a plurality of photoelectric conversion sections arranged in a row in a main scanning direction; a moving device to move the line sensor and the document relative to each other in a secondary scanning direction crossing the main scanning direction, wherein the memory medium further stores a reading control procedure for reading the images on the document by dividing the document into a plurality of areas through main scanning by the plurality of photoelectric conversion sections and the secondary scanning by the moving device in a sequential manner.

In accordance with embodiments of the present invention, the image reading device of the memory system comprises an area sensor having a plurality of photoelectric conversion sections arranged in rows and columns, and the memory medium further stores the reading control procedures for reading the image on the document by dividing the image into a plurality of areas corresponding to the plurality of photoelectric conversion sections.

In accordance with embodiments of the present invention, the memory medium of the memory system further stores a gradation conversion process procedure for converting a gradation based on the first image reading condition or the second image reading condition.

In accordance with embodiments of the present invention, the image reading system of the memory system further comprises a memory to store a plurality of gamma values, and the memory medium further stores a conversion process procedure to execute a conversion process for the first image reading condition by reading a first gamma value from the memory and to execute conversion process for the second image reading condition by reading a second gamma value from the memory.

In accordance with embodiments of the present invention, the image reading system of the memory system further comprises a memory to store a plurality of contrast characteristic values, and the memory medium further stores a conversion process procedure to execute a conversion process for the first image reading condition by reading a first contrast characteristic value from the image reading system memory and to execute a conversion process for the second image reading condition by reading a second contrast characteristic value from the memory.

In accordance with embodiments of the present invention, the image reading system of the memory system further comprises an amplifying device to amplify the image signals read by the image reading device, and the memory medium further stores a gradation conversion control procedure to drive the amplifying device at a first amplifying level based on the first image reading condition, and to drive the amplifying device at a second amplifying level based on the second image reading condition.

In accordance with embodiments of the present invention, the image reading system of the memory system comprises a color separation device to separate the colors in the image on the document, and the memory medium further stores an image processing procedure to execute a color balancing process, based on the first image reading condition and the second image reading condition, for the image signals output by the image reading device corresponding to the respective images of which colors have been separated by the color separation device.

In accordance with embodiments of the present invention, the memory medium of the memory system further stores a display control procedure to display the images, side by side, based on the first and second image signals.

In accordance with embodiments of the present invention, the memory medium of the memory system further stores a display control procedure to interchangeably display the images based on the first and second image signals.

Objects and advantages of the present invention are achieved in accordance with another embodiment of the present invention with a memory system for an image reading system comprising an image reading device to read an image on the document by dividing the image into a plurality of areas and to output image signals corresponding to the plurality of areas; a reading condition input device to set a first image reading condition and a second image reading condition; and a memory medium to store control procedures for the image reading system, including an output control procedure to control the image reading device based on the first image reading condition to output a first image signal corresponding to a first area, among the plurality of areas, and to control the image reading device based on the second image reading condition to output a second image signal corresponding to a second area, among the plurality of areas, and to store display procedures to display respective images based on the first and second image signals.

In accordance with embodiments of the present invention, the image reading device of the memory system comprises a line sensor having a plurality of photoelectric conversion sections arranged in a row in the main scanning direction; and a moving device to move the line sensor and the document relative to each other in a secondary scanning direction crossing the main scanning direction, wherein the memory medium further stores a reading control procedure to read the image on the document by dividing the image into a plurality of areas through main scanning by the plurality of photoelectric conversion sections and secondary scanning by the moving device in a sequential manner.

In accordance with embodiments of the present invention, the memory medium of the memory system further stores a gradation conversion control procedure to control conversion of gradation based on the first image reading condition or the second image reading condition.

In accordance with embodiments of the present invention, the image reading device of the memory system comprises a line sensor having a plurality of photoelectric conversion sections arranged in a row in a main scanning direction; and a moving device to move the line sensor and the document relative to each other in a secondary scanning direction crossing the main scanning direction; and the memory medium further stores the gradation conversion control procedure to drive the plurality of photoelectric conversion sections at a first image accumulation time based on the first image reading condition and to drive the plurality of photoelectric conversion sections at a second image accumulation time based on the second image reading condition.

In accordance with embodiments of the present invention, the image reading device of the memory system comprises a lighting device to light the document, and the memory medium further stores the gradation conversion control procedure to drive the lighting device at a first lighting time based on the first image reading condition, and to drive the lighting device at a second lighting time based on the second image reading condition.

In accordance with embodiments of the present invention, the image reading device of the memory system comprises an area sensor having a plurality of photoelectric conversion sections arranged in rows and columns, and the memory medium further stores a reading control procedure to read the image of the document by dividing the image into a plurality of areas corresponding to the plurality of photoelectric conversion sections.

In accordance with embodiments of the present invention, an image reading device of the memory system comprises a color separation device to separate the colors in the image of the document, and the memory medium further stores a control procedure to execute color balancing control according to the first image reading condition and the second image reading condition.

In accordance with embodiments of the present invention, the memory medium of the memory system further stores a display control procedure to display images, side by side, based on the first and second image signals.

In accordance with embodiments of the present invention, the memory medium of the memory system further stores a display control procedure to interchangeably display respective images based on the first and second image signals.

Objects and advantages of the present invention are achieved in accordance with embodiments of the present invention with a memory system for an image reading system comprising an image reading device to read an image on a document by dividing the image into a plurality of areas and to output image signals corresponding to the plurality of areas; a reading condition input device to set a first image reading condition and a second image reading condition; and a memory medium to store control procedures for the image reading system including an image processing procedure to convert the image signal corresponding to a specified area, among the plurality of areas, into a first image signal based on the first image reading condition and to convert the image signal corresponding to the specified area into a second image signal based on a second image reading condition, and to store a display procedure to display the images, side by side, based on the first and second image signals.

Objects and advantages of the present invention are achieved in accordance with embodiments of the present invention with a memory system for an image reading apparatus comprising an image reading device to read an image on a document by dividing the image into a plurality of areas and to output image signals corresponding to the plurality of areas; a reading condition input device to set a first image reading condition or a second image reading condition; and a memory medium to store control procedures for the image reading apparatus, including an image processing procedure to convert an image signal corresponding to a first specified area, among the plurality of areas, into a first image signal based on the first image reading condition and to convert an image signal corresponding to a second specified area into a second image signal based on the second image reading condition, and to store an output control procedure to output the first and second image signals to external devices.

Objects and advantages of the present invention are achieved in accordance with embodiments of the present invention with a memory system for an image reading apparatus comprising an image reading device to read an image on a document by dividing the image into a plurality of areas and to output image signals corresponding to the plurality of areas; a reading condition input device to set a first image reading condition or a second image reading condition; and a memory medium to store control procedures for the image reading apparatus, including a first output procedure to control the image reading device based on the first image reading condition to output a first image signal corresponding to a first specified area, among the plurality of areas, and to control the image reading device based on the second image reading condition to output a second image signal corresponding to a second specified area, among the plurality of areas, and to store a second output procedure to output images based on the first and second image signals to external devices.

In accordance with embodiments of the present invention, the image processing device executes a conversion process to convert the image signals corresponding to the plurality of areas read by the image reading device, for respective areas, according to the set image reading conditions, and the display device displays respective images based on the converted image signals for each area.

Further, in accordance with embodiments of the present invention, the image reading device reads a plurality of areas according to the image reading conditions set under control of the control device in order to output the respective image signals, and the display device displays the respective images.

Moreover, in accordance with embodiments of the present invention, the image processing device executes a conversion process to convert the image signals corresponding to a plurality of areas read by the image reading device by applying the set image reading conditions to the same specified areas to generate a plurality of images, and the display device displays respective images.

As a result, in accordance with the present invention, users can advantageously display images with a plurality of types of appearances on the monitor screen with a single setting operation.

In accordance with embodiments of the present invention, the image reading device may comprise of a line sensor and a moving device, or may comprise an area sensor.

In accordance with embodiments of the present invention, the image processing device can execute a conversion process of the image signals by changing the gradation according to the set image reading conditions. More specifically, the conversion process can be achieved by changing gamma values, contrast characteristic values, or amplification level to different levels.

Moreover, in accordance with embodiments of the present invention, the control device can output the image signals in which gradations have been varied according to the set image reading conditions. More specifically, the control device can output the image signals in which gradations have been varied according to a plurality of levels by changing the accumulation time if the image reading device comprises a line sensor and a moving device, or by changing the lighting time of the lighting device included in the image reading device.

Furthermore, in accordance with embodiments of the present invention, the image reading device may include a color separation device to obtain image signals having a color balance which is varied according to the set image reading conditions.

In accordance with embodiments of the present invention, the display device can display the images side by side and the display device can also interchangeably display respective images.

Further, in accordance with embodiments of the present invention, the image processing device executes the conversion process for the image signals, corresponding to a plurality of areas read by the image reading device, for each different specified area according to the set image reading conditions, to generate a plurality of image signals, and the output device outputs respective image signals to the external devices.

Furthermore, in accordance with embodiments of the present invention, the image reading device reads the plurality of areas according to the set image reading conditions under control of the control device to output respective image signals, and the output device outputs the respective image signals to the external devices.

As a result, in accordance with the present invention, the external devices receive respective image signals according to a plurality of reading conditions, thereby substantially reducing the load of image processing.

In accordance with embodiments of the invention, a memory medium stores the control procedures for the image reading system.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 7 is an explanatory diagram for reading an image under various conditions in accordance with the embodiments of the present invention.

FIG. 8 is an explanatory diagram for reading an image under various conditions in accordance with the embodiments of the present invention.

FIGS. 9A–9D are explanatory diagrams illustrating the preliminary image data separated in accordance with the embodiments of the present invention.

FIG. 10 is a diagram illustrating the separation and generation of the preliminary images in accordance with the embodiments of the present invention.

FIG. 11 is a diagram illustrating the separation and generation of the preliminary images in accordance with the embodiments of the present invention.

DESCRIPTION OF THE PREFERRED EMBODIMENTS

Figure 1:
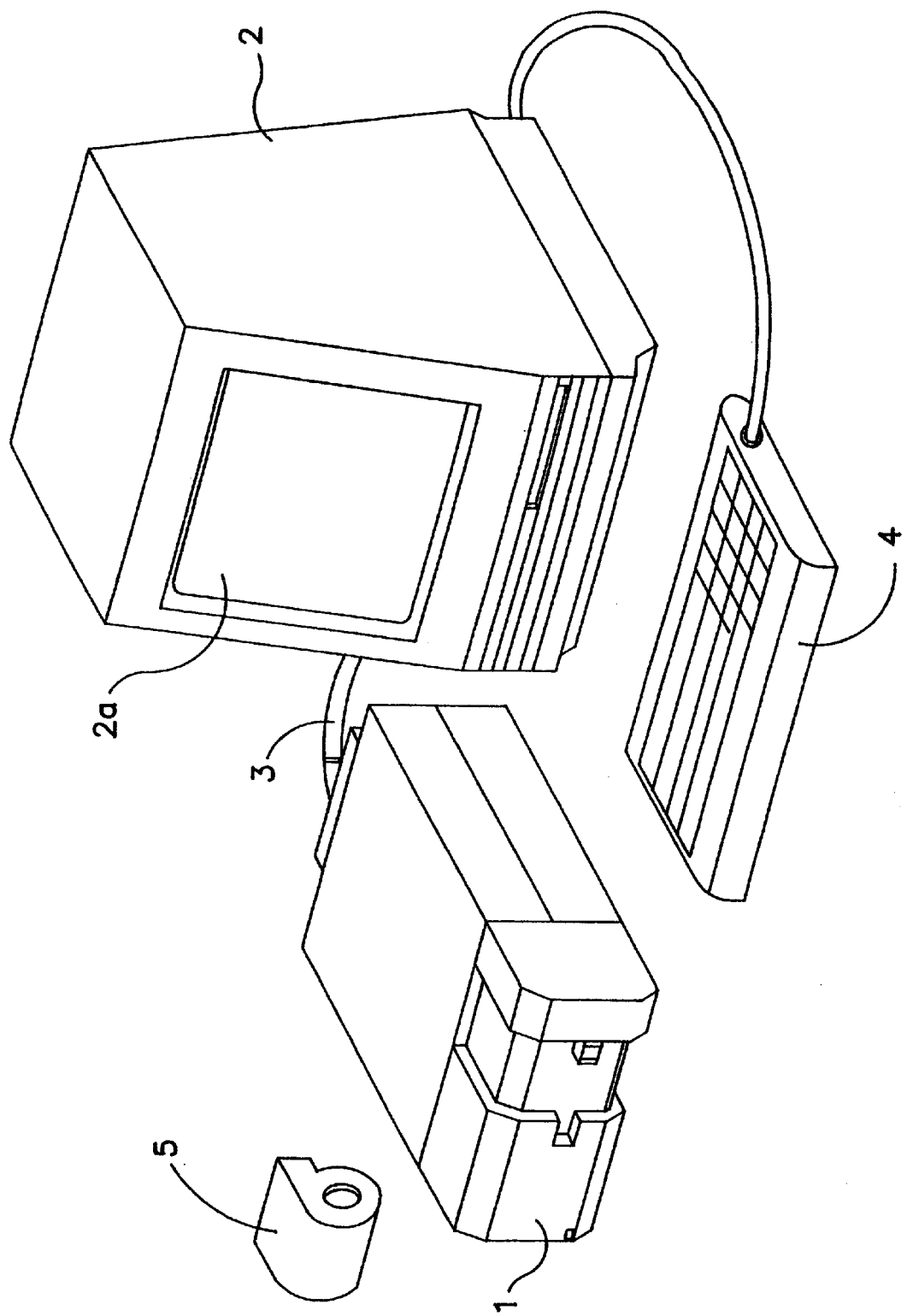
FIG. 1 is a diagram of an image reading system in accordance with embodiments of the present invention.

Reference will now be made in detail to the preferred embodiments of the present invention, examples of which are illustrated in the accompanying drawings, wherein like reference numerals refer to like elements throughout.

FIG. 1 is a diagram illustrating the external appearance of components of an image reading system in accordance with embodiments of the present invention. As shown in FIG. 1, the image reading system comprises an image reading apparatus 1 and a control device 2 connected to the image reading apparatus 1 with a communication cable 3. The control device 2 includes a central processing unit (hereinafter referred to as a "CPU"), a computer device having a program memory (ROM) and a working memory (RAM), and a display device including a monitor screen 2a arranged in a box-like body to output image data by the image reading apparatus 1.

The image reading apparatus 1 is an input device for the computer device of the control device 2. A keyboard 4 and a mouse (not shown in the figure) are connected to the control device 2 via a cable. The keyboard 4 and the mouse are also input devices to the computer device of the control device 2. Further, a cartridge 5 is loaded into the image reading apparatus 1.

Figure 2:
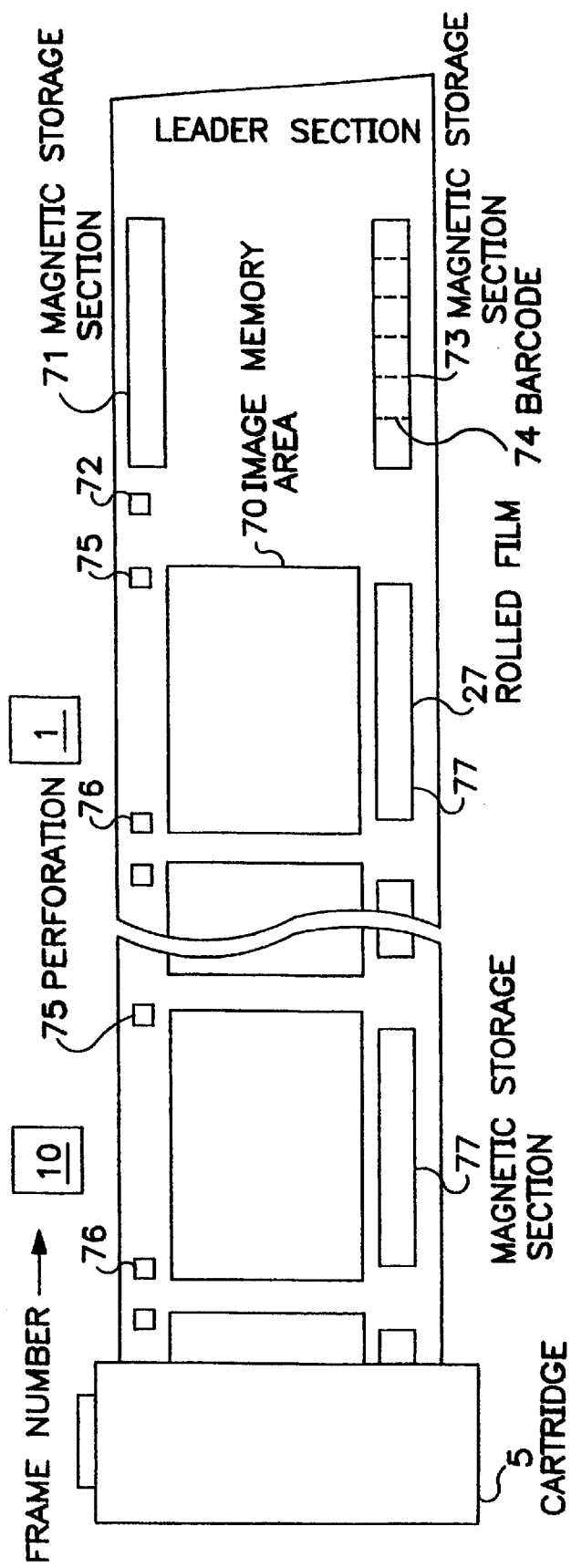
FIG. 2 is a diagram illustrating a film cartridge and film utilized in accordance with embodiments of the present invention.

As shown in FIG. 2, a long film (hereinafter referred to as "rolled film") is accommodated in the cartridge 5. More particularly, FIG. 2 illustrates the external appearance of the rolled film 27 accommodated in the cartridge 5 when the rolled film is partially extended from the cartridge 5 in accordance with embodiments of the present invention. As shown in FIG. 2, a specified area of a beginning portion of the rolled film 27 (pull out side), shown on the right side of FIG. 2, is referred to as a leader section. Following the leader section, image memory areas 70 for each frame are provided at specified intervals.

In the leader section, a magnetic storage section 71 and a perforation 72 are provided on one side of the film and extend in a lengthwise direction of the film. A magnetic storage section 73 and a barcode 74 are also provided extending in a lengthwise direction of the leader section on a side of the film opposite the magnetic storage section 71 and perforation 72. Further, associated with each frame, two perforations 75 and 76 are provided outside of the image memory area 70 on one side of the film and a magnetic storage section 77 is provided outside of the image memory area 70 on a side of the film opposite the perforations 75 and 76.

Film information, such as the type of film, the frame number, the total number of frames, etc., is stored in the magnetic storage sections 71 and 73. The film information representing the type of film indicates whether the film is color film, monochrome film, positive film, or negative film. The barcode 74 displays the film information according to the difference in density of the barcode information.

Information concerning photography is recorded in each magnetic storage section 77, such as frame numbers, title, date of photographic action, photographic conditions, designated print size, etc. The items of information recorded in the magnetic storage section 77 can be written from a camera at the time of photography, or, alternatively, the items recorded in the magnetic storage section 77 can also be written at the time of film development.

For example, the designated print sizes include high vision size (H size), classic size (C size), and panoramic size (P size). Aspect ratios are 16:9 for H size, 3:2 for C size, and 3:1 for P size.

Figure 3:
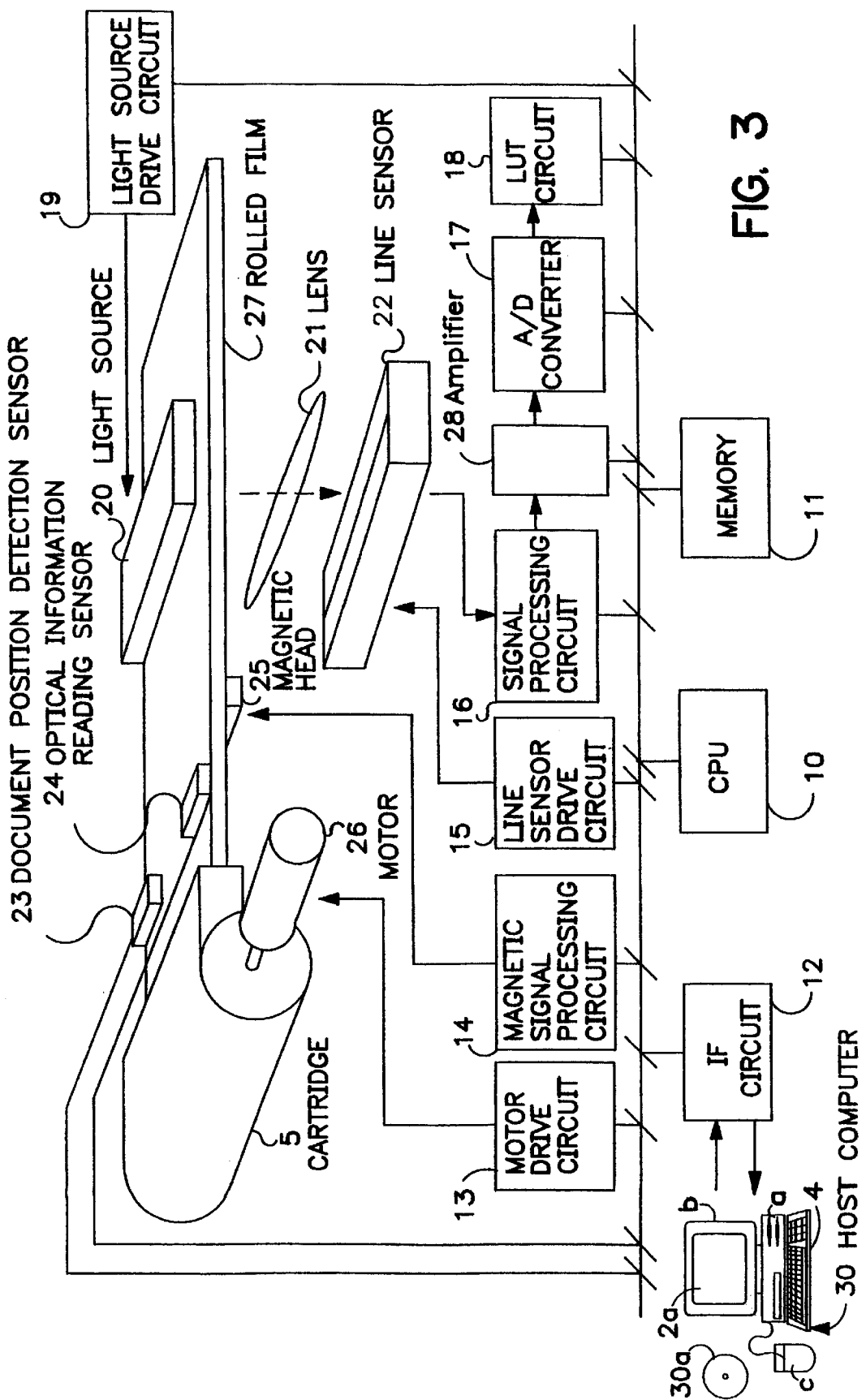
FIG. 3 is a schematic diagram of an image reading device in accordance with embodiments of the present invention.

FIG. 3 is a schematic diagram of an image reading system in accordance with embodiments of the present invention. FIG. 3 primarily illustrates the configuration of the image reading apparatus 1 shown in FIG. 1. As shown in FIG. 3, the image reading apparatus includes a CPU 10, a memory 11, an interface circuit (hereinafter referred to as an "IF circuit") 12, a motor drive circuit 13, a magnetic signal processing circuit 14, a line sensor drive circuit 15, a signal processing unit 16, an amplifier 28, an A/D converter 17, a look-up table circuit (hereinafter referred to as an "LUT circuit") 18, a light source drive circuit 19, a light source 20, a lens 21, a line sensor 22, a document position detection sensor 23, an optical information reading sensor 24, a magnetic head 25, a motor 26, a loading chamber (not shown in the figure) in which the cartridge 5 is loaded, and a transfer path for the rolled film 27 that is extended from the cartridge 5.

The above-described elements correspond to the image reading apparatus 1 shown in FIG. 1. The image reading system shown in FIG. 3 also comprises a host computer 30 connected to the image reading apparatus 1 via the IF circuit 12. The host computer 30 includes a computer device 'a', a display device 'b' having the monitor screen 2a, a keyboard 4, and a mouse 'c' which correspond to the computer device, display device, keyboard 4 and mouse, respectively described with respect to FIG. 1. The host computer 30 also includes a hard disk drive (HDD), which enables a program to be set up and stored in a memory medium 30a, such as a CD-ROM.

In operation of the image reading system shown in FIGS. 1–3, a user loads the cartridge 5 into the loading chamber of the image reading apparatus 1. Then, a spool of the cartridge 5 is linked to the shaft of the motor 26. As the user closes a lid of the loading chamber, electrical power is supplied to each circuit of the image reading apparatus 1, thereby starting each circuit.

The motor drive circuit 13 controls the rotational speed, direction of rotation, and stopping of the motor 26 according to instructions from the CPU 10. When the motor 26 rotates, the rolled film 27 is extended to the transfer path from the cartridge 5. On the other hand, when the motor 26 reverses, the rolled film 27 is rewound into the cartridge 5 from the transfer path.

The document position detection sensor 23 optically detects each perforation in the film and provides a signal indicating a detected perforation to the CPU 10. The optical information reading sensor 24 reads the film information in the barcode section 74 and provides the film information to the CPU 10.

The magnetic head 25 reads the information magnetically recorded in the magnetic storage sections 71, 73 and 77, and provides the information read from magnetic storage sections 71, 73 and 77 to the CPU 10 under control of the magnetic signal processing circuit 14. The magnetic head 25 also writes data magnetically in the magnetic storage sections 71, 73, and 77 under control of the magnetic signal processing circuit 14. The magnetic signal processing circuit 14 digitizes the magnetically recorded information read by the magnetic head 25 and provides the digitized information to the CPU 10. Furthermore, the magnetic signal processing circuit 14 provides the magnetic head 25 with information that is to be written in the magnetic storage section 77 under control of the CPU 10.

The light source 20 lights a surface of the rolled film 27 under control of the light source drive circuit 19. The light source 20 may include a light emitting diode (hereinafter referred to as an "LED"). For example, the light source 20 may include an LED having three colors, such as R (red), G (green), and B (blue). In the case that the light source includes an LED, the light source drive circuit 19 controls the ON/OFF switching of the LED having three colors according to instructions from the CPU 10.

Alternatively, the light source 20 may be a light source of white light. In the case that the light source 20 is a light source of white light, the light source 20 may include three color filters to filter three different colors, for example, R (red), G (green), and B (blue). If the light source includes three color filters, a switching mechanism for the three color filters is required.

The lens 21 is arranged in a manner to guide the light from light source 20 that penetrates the rolled film 27 to a light receiving plane of the line sensor 22. The line sensor 22 includes an image accumulation section, which functions as a plurality of photoelectric conversion sections provided in a horizontal row, and a transfer section to transfer the electric charge accumulated in each image accumulation section.

The line sensor 22 is arranged such that the light receiving plane of the plurality of image accumulation sections provided in a horizontal row are perpendicular to the moving direction of the rolled film 27.

The line sensor 22 is preferably either a black and white image sensor or a color image sensor. If the line sensor is a black and white image sensor, the light source 20 used with the black and white image sensor is either a white light source or a light source that can switch the three colors of lights: R (red), G (green), and B (blue). If the line sensor 22 is a color image sensor, the light source 20 is a white light source.

The line sensor drive circuit 15 executes the following control operation to drive the line sensor 22 according to the instructions from the CPU 10. The line sensor drive circuit 15 controls an accumulation operation as well as an accumulation time of the line sensor 22. Furthermore, the line sensor drive circuit 15 controls the main scanning to send the accumulated electric charge (of image signals and electrical signals) to the signal processing circuit 16.

The signal processing circuit 16 amplifies and processes the signals from the line sensor 22 according to the instructions from the CPU 10, and provides the processed signals to the A/D converter 17. Signal processing performed by the signal processing circuit 16 includes correlated double sampling (CDS), shading compensation, dark current compensation, odd and even compensation, etc.

The amplifier 28 amplifies the output of the signal processing circuit 16 to an appropriate level and provides the amplified signal to the A/D converter 17. In accordance with embodiments of the present invention, the amplifier 28 includes an electronic volume (EVR) to operate the CPU 10, and can change the amplification to a plurality of levels under control of the CPU 10. As a result, gradation characteristics for brightness can be modified.

The A/D converter 17 converts the image signal from the signal processing circuit 16 via amplifier 28 into a digital signal, and provides the digital signal to the CPU 10 and the LUT circuit 18. The bit width of the digital signal is, for example, eight (8) bits. In accordance with embodiments of the present invention, various gamma values, as well as various contrast adjustment tables are set in the LUT circuit 18. The various gamma values and contrast adjustment tables are selected for use under control of the CPU 10. As a result, gradation characteristics can be modified.

The CPU 10 controls each section according to a program set in the memory 11, thereby realizing various functions of the image reading apparatus 1. For example, when the cartridge 5 is loaded, the CPU 10 sets the first frame of the rolled film 27 at a standby reading position of the line sensor 22.

The CPU 10 reads the image, and magnetically recorded information, on the rolled film 27 according to the reading instructions provided by the host computer 30 via the IF circuit 12 to output the image and information to the host computer 30. In accordance with embodiments of the present invention, the reading instructions provided by the host computer 30 include a plurality of reading conditions set by a user on the monitor screen 2a of the host computer 30.

The CPU 10 controls each section as follows. Upon receiving an output from the document position detection sensor 23 and the optical information reading sensor 24, the CPU detects the position of the perforations and decodes the barcode information. The CPU 10 also controls the motor drive circuit 13, the magnetic signal processing circuit 14, the line sensor drive circuit 15, and the light source drive circuit 19 to read the rolled film 27. At this time, the CPU 10 controls the image reading operation by modifying the accumulation time and light amount in several ways according to the various reading conditions entered to the host computer 30. As a result, gradation characteristics for brightness can be modified.

Moreover, the CPU 10 inputs the magnetically recorded information and film images read by controlling the magnetic signal processing circuit 14, the signal processing circuit 16, the amplifier 28, the A/D converter 17, the LUT circuit 18, and the light source drive circuit 19 to store the magnetically recorded information and the film image in the memory 11. At this time, the CPU 10 stores into the memory 11 one line of data (the line data) read in the main scanning direction as line data in three colors: R (red), G (green), and B (blue).

Furthermore, the CPU 10 stores one line of the line data read into memory 11 as line data in one of three colors: R (red), G (green), and B (blue). At that time, the CPU 10 executes an operation to modify the color balance of the line data in three colors in various ways, or to modify the chromaticity of the line data of a single color in various ways according to various reading conditions.

The memory 11 is a program memory and a working memory. The IF circuit 12 in accordance with embodiments of the invention is a Small Computer System Interface (SCSI). The IF circuit 12 outputs the line data, which is stored in memory 11, to the host computer 30.

The host computer 30 displays the line data received from the IF circuit 12 on the monitor screen 2a. Furthermore, the host computer 30 provides the IF circuit 12 with various instructions entered through the keyboard 4 or the mouse 'c.' In accordance with embodiments of the present invention, the host computer 30 displays on the monitor screen 2a several preliminary images corresponding to the reading conditions designated by the user, thereby allowing the selection of an image as the final image. Subsequently, the host computer 30 provides the CPU 10 with the reading conditions for the selected final image in order for the CPU 10 to execute the reading operation.

Operation of the image reading system in accordance with embodiments of the present invention will now be described below with reference to FIGS. 4–15. In the following description, an image reading apparatus is referred to as a "scanner" when appropriate.

Further, in the following description of embodiments of the present invention, "pre-scanning" and "main scanning" are used as scanner-related terms with differing definitions. The term "preliminary image" used in accordance with the description of embodiments of the present invention includes images obtained through both pre-scanning and main scanning. This is because the image obtained through main scanning may be subject to further modifications. Therefore, in accordance with embodiments of the present invention, the image fully selected is referred to as "the final image."

Figure 4:
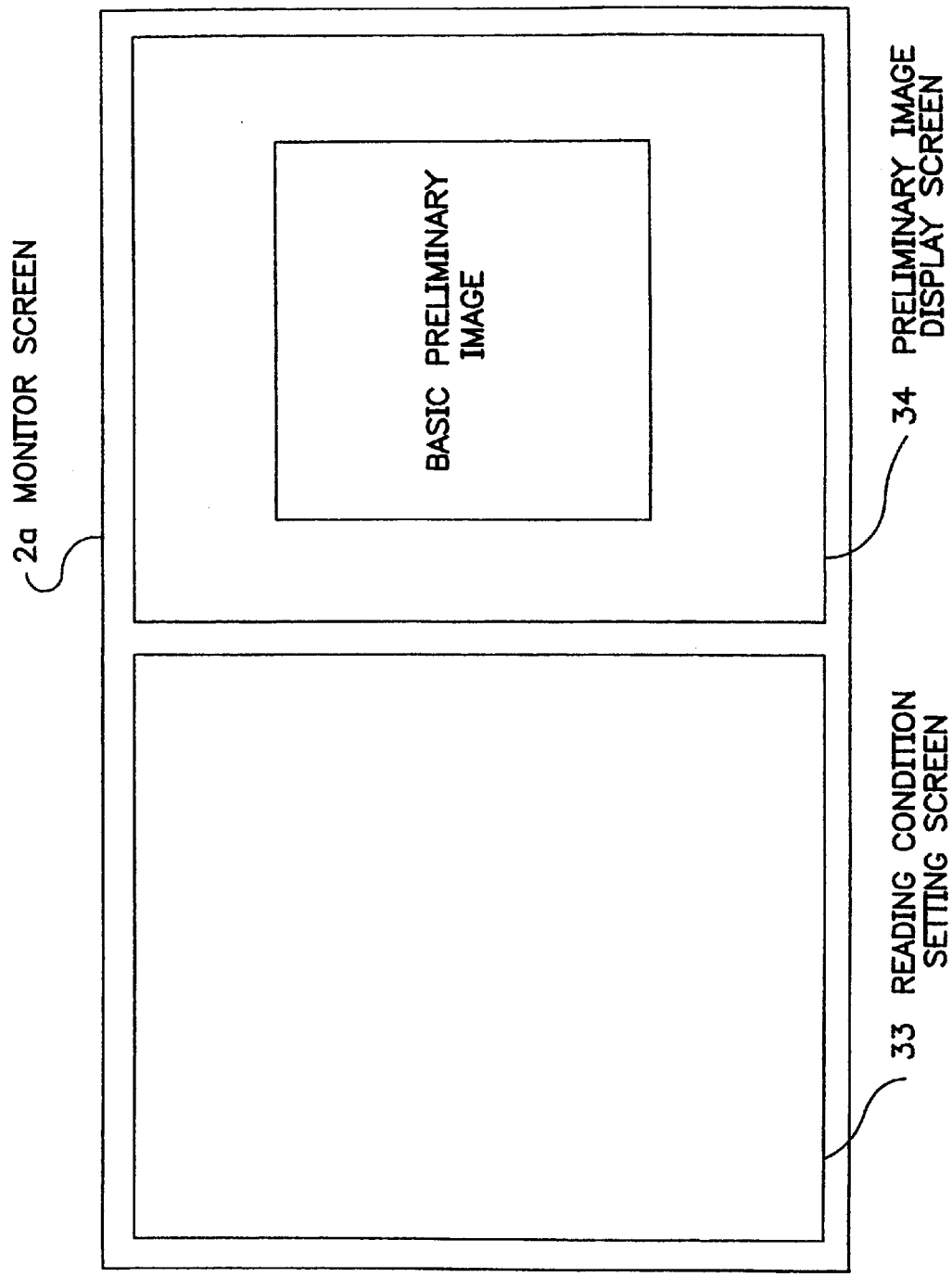
FIG. 4 illustrates an example of a monitor screen display displaying a basic preliminary image in accordance with embodiments of the present invention.
Figure 5:
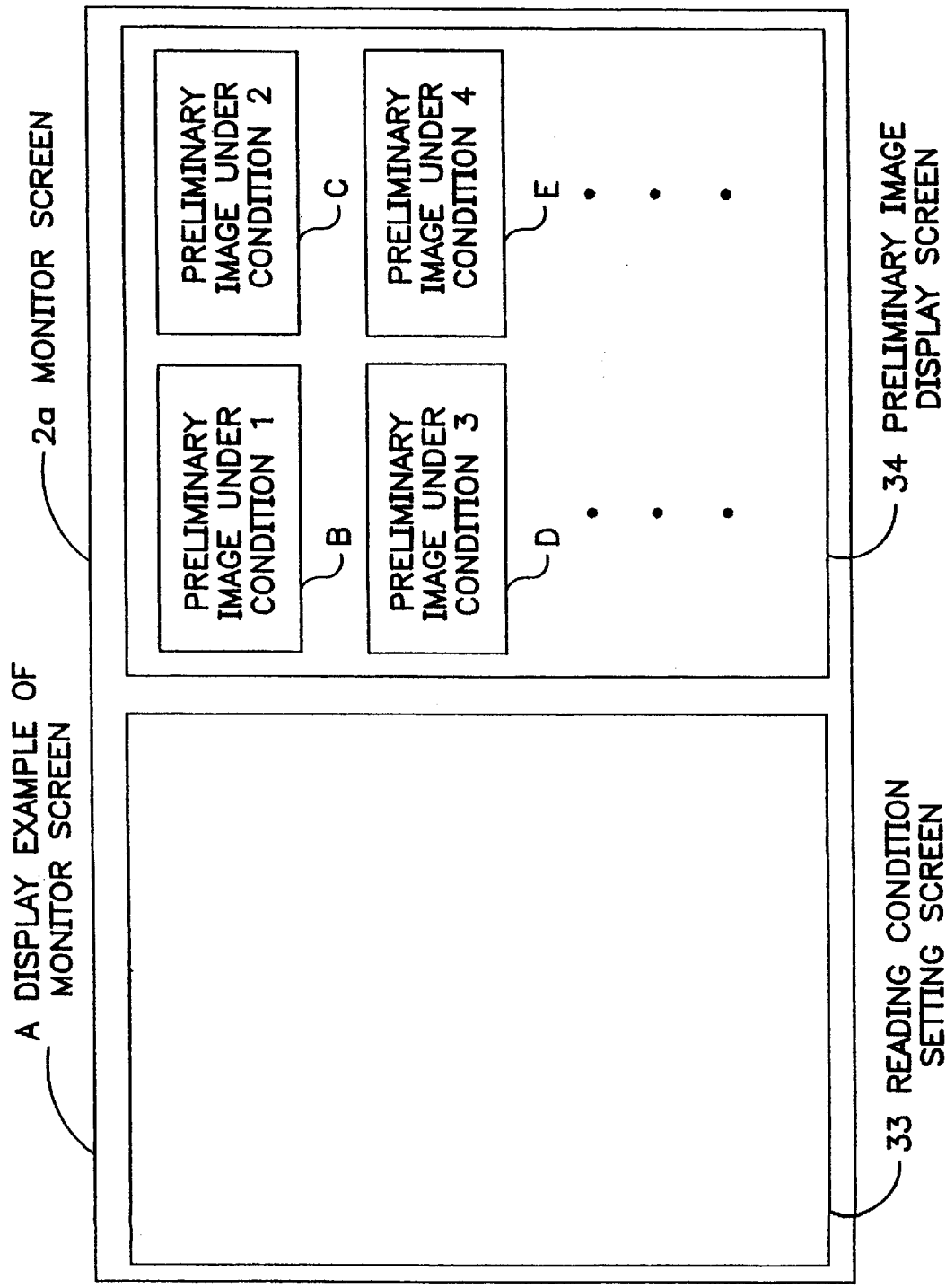
FIG. 5 illustrates an example of a monitor screen display displaying a plurality of preliminary images read under various conditions in accordance with embodiments of the present invention.
Figure 6:
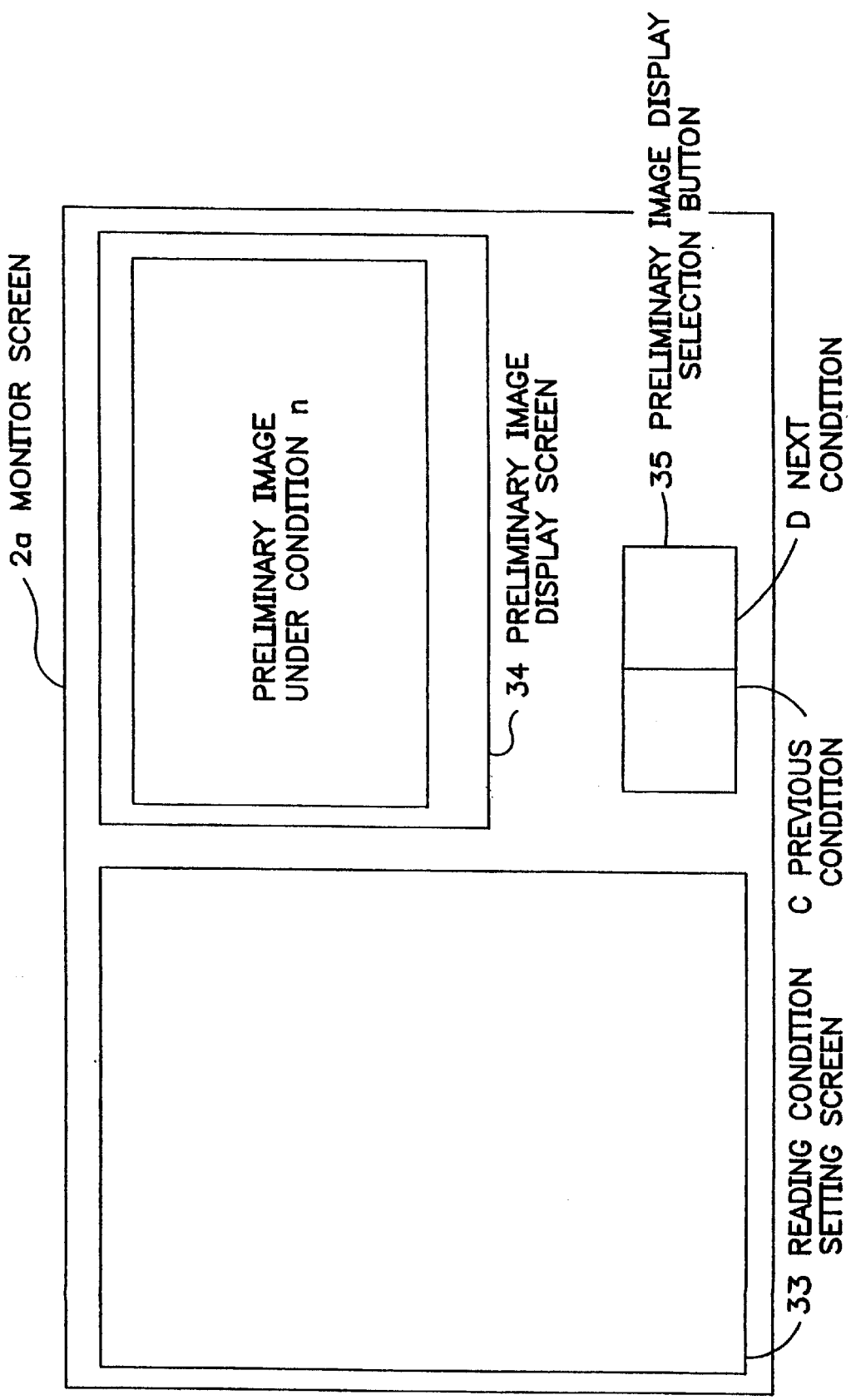
FIG. 6 illustrates an example of a monitor screen display for displaying a selected preliminary image in accordance with embodiments of the present invention.

Operation of embodiments of the present invention will now be described with reference first to FIGS. 4–6. FIGS. 4–6 are diagrams illustrating examples of displays by the monitor screen 2a. FIG. 4 illustrates the display of a basic preliminary image. FIGS. 5 and 6 illustrate displays for a plurality of preliminary images. As shown in FIGS. 4–6, the monitor screen 2a includes both a reading condition setting screen 33 and preliminary image display screen 34.

In accordance with embodiments of the present invention, the film used is a new type of rolled film as shown in FIG. 2. A user manipulates the keyboard 4 or mouse to display the monitor screen 2a, as shown in FIG. 4. The user then designates a frame to be read preliminarily and enters the reading instructions on the reading condition setting screen 33.

The host computer 30 transmits the entered reading instructions with the frame designated by the user to the scanner. In the scanner, the CPU 10 controls each section to detect the designated frame from the magnetically recorded information in the magnetic storage section 77. Then, the CPU 10 reads the image memory area 70 of the frame under the predetermined reading conditions, and outputs each line data to the host computer 30.

The host computer 30 generates a frame image from the data obtained by the above-described process. The host computer 30 then displays the generated frame image as a basic preliminary image on the preliminary image display screen 34 of the monitor screen 2a. After verifying the basic preliminary image, the user enters a plurality of reading conditions for obtaining a plurality of preliminary images on the reading condition setting screen 33. The reading conditions include the gradation characteristic and the color balance.

A plurality of gradation characteristics with different characteristics, such as gamma characteristics, brightness, and contrast, can be set as the reading conditions. Further, it is possible to set the same gradation characteristic at several different levels. Still further, the color balance for a plurality of colors can be set at several different levels, and the chromaticity of a single color can be set at several different levels. Furthermore, the reading conditions can be set by randomly combining the gradation characteristic and the color balance.

As a result of entering the reading conditions, a number of preliminary images corresponding to the number of reading conditions are generated through cooperative operation of the scanner and the host computer 30. The host computer 30 displays the preliminary image(s) on the preliminary image display screen 34 in accordance with a display method as shown in FIGS. 5 and 6.

FIG. 5 illustrates a method of displaying a plurality of preliminary images side by side on the monitor screen 2a. FIG. 6 illustrates a method of sequentially displaying a plurality of preliminary images one at a time. As shown in FIG. 6, by manipulating a preliminary image display selection button 35, preliminary images for each reading condition can be displayed in a sequential manner. As shown in FIG. 5, which is a side by side lateral display system, although preliminary images can be directly compared, it becomes more difficult to identify the detailed areas since the images become smaller as the number of displayed images increases. On the other hand, with a sequential display system as shown in FIG. 6, it is possible to adequately identify the detailed areas as the enlarged image is displayed with some reliance on one's memory. Selection of the type of display system depends on the size of the screen, the number of display images, and the reading conditions.

The designation of a frame and setting of reading conditions may be performed at the same time. Since the designated frame can be detected from the magnetically recorded information on the rolled film 27, it is possible to read the images as soon as the frame is detected, thereby increasing the speed.

Furthermore, the document read by the image reading apparatus is not limited to a rolled film. For example, the document may be a conventional reversal film. In the case the document is a reversal film, since the frame to be read has been determined, the reading conditions may simply be entered. In this regard, the document is not necessarily a film document, and it may be a photograph.

When generating the plurality of image data matching the plurality of image reading conditions from the image data of one frame, the scope of the functions performed by host computer 30 and by the scanner differ depending on whether the images are generated by the host computer 30 or scanner.

The scope of the functions performed by the host computer 30 and by the scanner will be as follows if the images are generated on the host computer 30. More particularly, the host computer 30 provides the scanner with normal reading instructions that do not include a plurality of reading conditions. Consequently, the scanner reads the image memory area 70 of the frame previously designated, along with certain reading conditions, and outputs each line data to the host computer 30. In this case, since the operation of the scanner is the same as that of obtaining the basic preliminary image described previously, a detailed description of its operation is omitted. The host computer 30 then simulates the images by applying a plurality of reading conditions to the image data of one frame obtained from the scanner and generates respective preliminary images corresponding to the plurality of reading conditions.

For example, assume that the plurality of reading conditions comprise four conditions: condition A, condition B, condition C, and condition D. The host computer 30 calculates the image data of one frame obtained from the scanner under condition A. The image data for the same frame are calculated under conditions B, C, and D. More particularly, the same pixel data are simulated under different conditions. As a result, four preliminary images that have been processed under conditions A, B, C and D are generated and are displayed on the monitor screen 2*a* shown in FIG. 5 or FIG. 6.

As a result of displaying four preliminary images processed under different conditions, the user can choose a desirable preliminary image from among the four preliminary images displayed on the monitor screen 2*a* as shown in FIG. 5 or FIG. 6, and enters instructions to designate the selected preliminary image. Subsequently, the host computer 30 transmits to the scanner a reading instruction with the reading conditions for the selected preliminary image. The scanner then reads the image based on the designated reading conditions.

When the images are generated on the scanner side, the host computer 30 provides the it scanner with the reading instructions that include the plurality of reading conditions. The scanner outputs line data to the host computer 30 matching the plurality of reading conditions according to the following two methods. More particularly, the first method of outputting line data to the host computer 30 is to actually execute an image reading operation with a plurality of image reading conditions. The second method is to match the output signals of the line sensor 22 with a plurality of reading conditions.

A more detailed explanation of the first method of outputting line data to the host computer 30 will now be provided below. More specifically, the first method is to assign one or more reading lines for each of the plurality of reading conditions during an image reading operation to read the image of a frame in its entirety. In this case, the host computer 30 can generate the preliminary images corresponding to respective image reading conditions by separating the obtained line data according to the plurality of reading conditions. The scanner allows the line data of one or more reading lines to be skipped. The skipping operational process can be executed by the host computer 30.

A specific example of the skipping operational process will now be explained below with reference to FIGS. 7–11. FIGS. 7 and 8 are explanatory diagrams for reading images under specified conditions. FIG. 9 is an explanatory diagram illustrating preliminary image data that has been separated. FIGS. 10 and 11 are explanatory diagrams illustrating how to separate the preliminary images.

FIGS. 7 and 10 illustrate instances when the locations of extracted pixels in the main scanning direction are different. FIGS. 8 and 11 illustrate instances when the location of extracted pixels in the main scanning direction are identical.

As shown in FIGS. 7 and 8, the numbers in the horizontal direction represent the numbers for the pixels of the line sensor 22. In the examples shown in FIGS. 7, 8, 10 and 11, there are sixteen (16) pixels in the line sensor 22. The numbers in the vertical direction represent the numbers of lines that are read. In the examples shown in FIGS. 7, 8, 10 and 11, there are sixteen (16) lines. Four (4) different conditions: condition A, condition B, condition C, and condition D are assigned for each line. More specifically, lines 1, 5, 9 and 13 are read under condition A. Lines 2, 6, 10 and 14 are read under condition B. Lines 3, 7, 11 and 15 are read under condition C, and lines 4, 8, 12 and 16 are read under condition D.

In each line, the pixel data represented by capital letters is used as the output data, and the pixel data represented by lower case letters in each line is not used as the output data. As shown in FIG. 7, the location of the pixels represented by capital letters on each line progressively move one pixel per line at a time. In FIG. 8, the location of the pixels represented by capital letters is at the same position for each line.

Upon receiving the output of the A/D converter 17, the CPU 10 discriminately selects (skips) and stores the data for each pixel under the conditions shown in FIG. 7 or FIG. 8 when storing the line data in the memory 11. The selection process may be executed using a dedicated computation chip instead of a software based processing method being used by the CPU 10. Specifically, the selection process may be executed through a gate alley.

As a result of the skipping operational process described above, the line data sent to the host computer 30 comprises the pixel data indicated in capital letters in FIG. 7 or FIG. 8. Consequently, as shown in FIG. 9, the host computer 30 generates the preliminary image data for each reading condition by separating and reorganizing each line data as described above.

However, on the other hand, if the skipping operational process is executed by the host computer 30, the scanner reads each line under respective conditions and outputs the line data in its entirety to the host computer 30.

The host computer 30 includes the selection condition tables as shown in FIG. 10 and FIG. 11. The selection condition table shown in FIG. 10 corresponds to FIG. 7, and the selection condition table shown in FIG. 11 corresponds to FIG. 8. In each line of the selection condition tables, the pixel data represented by capital letters is used as the preliminary image data, and the pixel data represented by lower case letters is not used as the preliminary image data. The host computer 30 selects and uses, from among the received line data, the pixel data represented in capital letters as the preliminary data in each line according to the selection conditions table shown in FIG. 10 or FIG. 11.

As shown in FIG, 9, the host computer 30 thereby generates the preliminary image data for each reading condition. If the host computer 30 executes the skipping process, the skipping rate in the main scanning direction is selected so that the vertical and lateral ratios of the image generated through the separation process is equal to, or at the closest value to, the ratios of the original image.

In other words, four preliminary images are generated according to the different pixel data processed under conditions A, B, C and D. The four preliminary images are displayed on the monitor screen 2a, as shown in FIG. 5 or FIG. 6.

The user selects the desired preliminary image on the monitor screen 2a in FIG. 5 or FIG. 6 in the same manner as described hereinabove and enters the selected preliminary image to be designated. The host computer 30 sends the reading instructions with the reading conditions for the selected preliminary image to the scanner, and the scanner reads the data under the designated reading conditions.

In accordance with the preferred embodiments of the present invention, the pixels form an area with both vertical and lateral ratios that are constant. Therefore, the line sensor 22 reads each line through main scanning and secondary scanning by dividing each line into a plurality of areas.

In accordance with the above description, the host computer 30 generates the preliminary image that corresponding to each reading condition by obtaining pixel data from a pixel of the original data. In addition to this method, the preliminary image can also be generated by obtaining pixel data, from among the plurality of data available, through simulation.

For example, the data for the pixel in the uppermost left hand corner among the preliminary images under condition A in FIG. 9A is calculated based on the data for the entirety of the sixteen (16) pixels that are on lines one (1) through four (4) and that correspond to the through fourth pixels. The data for the pixel in the uppermost left hand corner among the preliminary images under condition B in FIG. 9B is calculated based on the data for the entirety of the sixteen (16) pixels that are on lines two (2) through five (5) and that correspond to the second through fifth pixels. The data for the pixel in the uppermost left hand corner among the preliminary images under condition C in FIG. 9C is calculated based on the data for the entirety of the sixteen (16) pixels that are on lines three (3) through six (6) and that correspond to the third through sixth pixels. The data for the pixel in the uppermost left hand corner among the preliminary images under condition D in FIG. 9D is calculated based on the data for the entirety of the sixteen (16) pixels that are on lines four (4) through seven (7) and that correspond to the fourth through seventh pixels.

Each preliminary group of image data read under conditions A, B, C and D, as shown in FIGS. 9A–9D, can be generated by calculating the data for every preliminary image in the same manner.

Next, a description of how to change the degree of brightness as an example of varying the values in a plurality of levels under a single reading condition will be provided below. In the case of changing the degree of brightness, there are different instances of changing the degree of brightness, such as changing the light amount of the light source 20, changing the lighting time of the light source 20, and changing the accumulation time of the line sensor 22. As an example, changing the brightness by changing the accumulation time of the line sensor 22 will be described below.

Figure 12:
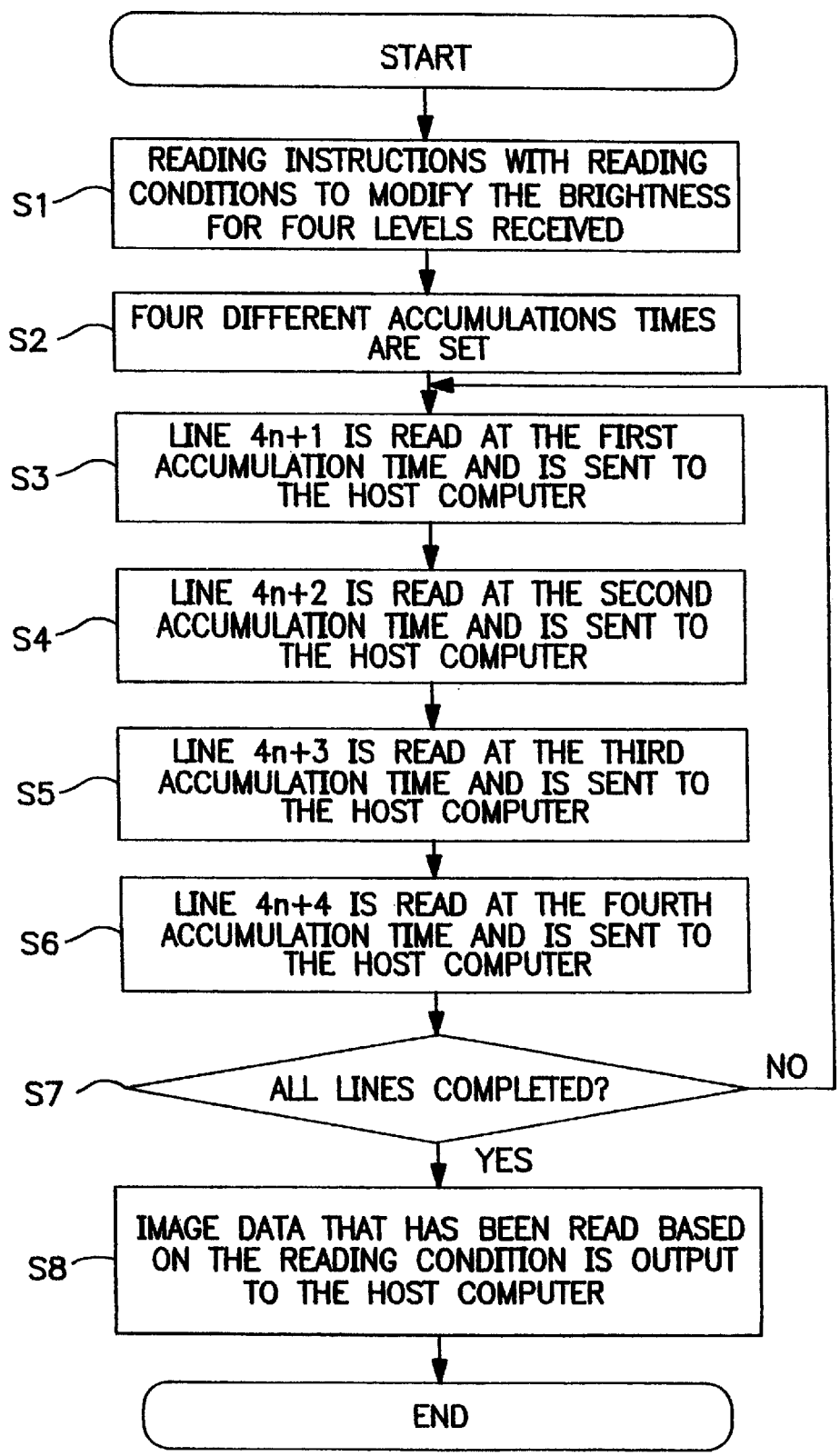
FIG. 12 a flowchart illustrating an operational process for reading preliminary images having four different levels of gradation characteristics with the image reading system in accordance with the embodiments of the present invention.
Figure 13:
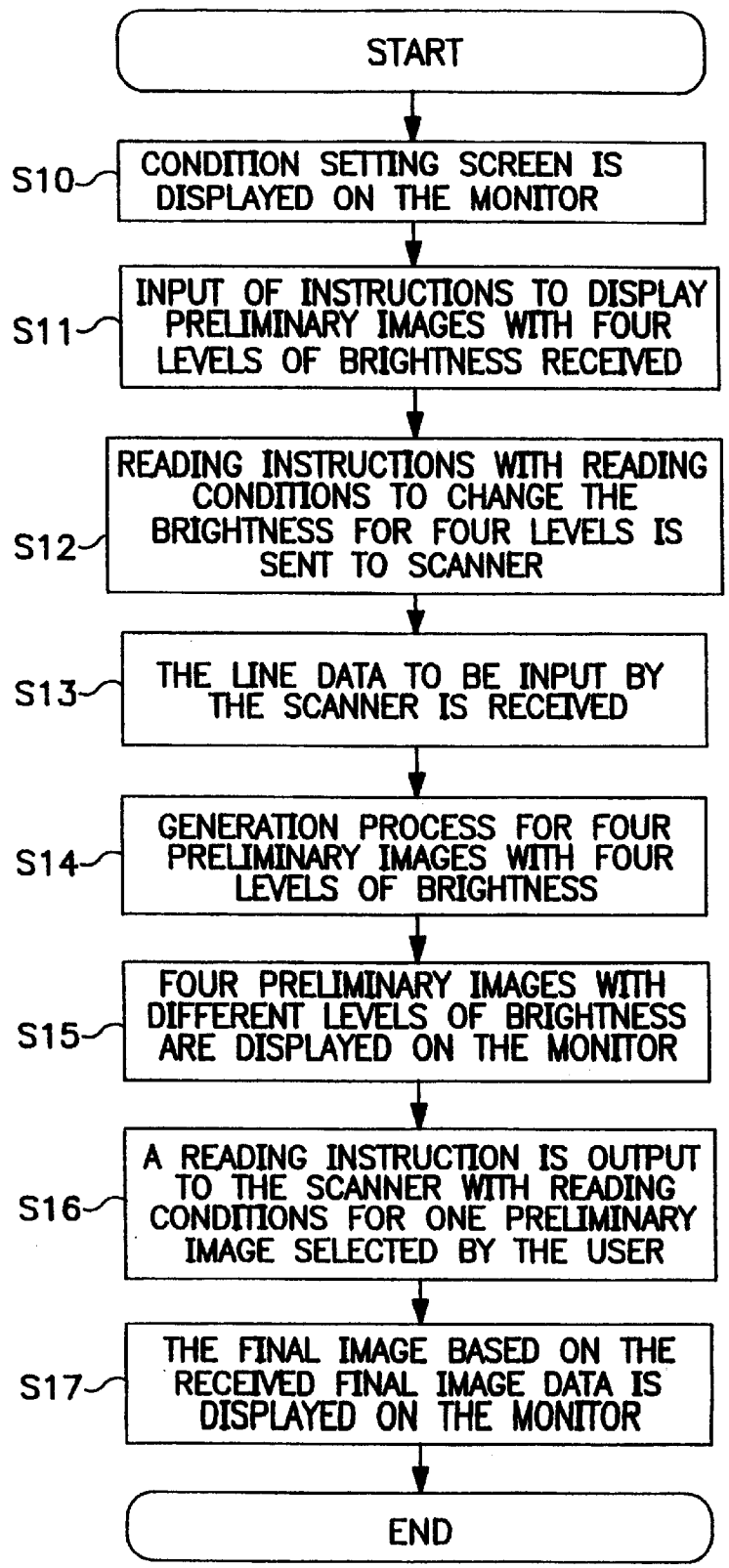
FIG. 13 is a flowchart illustrating an operational process for displaying the preliminary images having four different levels of gradation characteristics with the image reading system in accordance with the embodiments of the present invention.

FIG. 12 is a flowchart of an operational process for reading gradation characteristics by varying the gradation characteristics at four different levels with the image reading apparatus in accordance with embodiments of the present invention. FIG. 13 is a flowchart of an operational process for displaying under control of the host computer 30 the preliminary images with four different levels of gradation characteristics in accordance with embodiments of the present invention.

Beginning in step S1, the CPU 10 receives, from the host computer 30, the image reading instructions with a specified reading condition to change the level of brightness for four different levels of gradation characteristics. Next, in step S2, the CPU 10 sets four different accumulation times according to the reading instructions with a specified reading condition that has been received. The CPU 10 provides the set accumulation time to the line sensor drive circuit 15 to control the line sensor 22 to execute the operational process steps S3 through S6. Further, in the following explanation, n=0, 1, 2, and 3.

Continuing in step S3, the CPU 10 instructs the line sensor 22 to read line 4n+1 (when n=0, line 1) at the first accumulation time and outputs the line read to the host computer 30. In step S4, the CPU 10 instructs the line sensor 22 to read line 4n+2 (when n=0, line 2) at the second accumulation time and outputs the line read to the host computer 30.

Proceeding to step S5, the CPU 10 instructs the line sensor 22 to read line 4n+3 (when n=0, line 3) at the third accumulation time and outputs the line read to the host computer 30. Next, in step S6, the CPU 10 instructs the line sensor 22 to read line 4n+4 (when n=0, line 4) at the fourth accumulation time and outputs the line read to the host computer 30.

Subsequently, in step S7, the CPU 10 determines whether or not reading of all sixteen (16) lines has been completed. If the determination is "No," the operational process steps S3 through S6 are repeated until the determination in step S7 is "Yes." If the determination in step S7 is "Yes", the CPU 10 executes the operational process step S8, wherein upon receiving the reading instructions with the specified reading condition from the host computer 30, the CPU 10 reads the image matching the designated reading condition and outputs the matching image to the host computer 30. The operational process of FIG. 12 then ends.

Next, referring to FIG. 13, to display the preliminary images, in step S10, the host computer 30 displays the reading condition setting screen 34 on the monitor screen 2a according to manipulation by the user. In step S11, the host computer 30 executes the process to receive the display command for the preliminary image with the four different levels of brightness specified by the user.

Proceeding to step S12, the host computer 30 sends to the scanner the reading instructions with specified reading conditions to change the brightness for the four different levels. Then, in step S13, the host computer 30 executes a process to receive the line data that is to be input by the scanner.

Continuing, in step S14, the host computer 30 executes a process to generate four preliminary images for which the brightness levels are varied for four different levels. As stated above (FIG. 9), the preliminary images are generated for each accumulation time by separating and reorganizing each line data according to each of the four accumulation times.

Proceeding to step S15, the host computer 30 displays four generated preliminary images with different levels of brightness on preliminary image display screen 34 of the monitor screen 2a and waits for the user to select the appropriate image. In step S16, the host computer 30 sends to the scanner the reading instructions with the specified reading condition for the preliminary image selected by the user. Finally, in step S17, the host computer 30 displays the final image generated according to the received final image data on the monitor screen 2a, and ends the operational process.

Next, an explanation of the second method in which the output signals of line sensor 22 are matched with the plurality of image reading conditions on the scanner will be provided. Available methods include modifying the level of brightness for a plurality of levels by changing the amplitude of the amplifier 28; modifying the contrast levels, or gamma values, for the plurality of levels by setting a plurality of contrast adjustment tables; or setting a plurality of gamma values in LUT circuit 18.

First, an explanation of modifying the level of brightness for a plurality of levels by changing the amplitude of the amplifier 28 will be provided. In order to facilitate the following explanation, an area sensor is substituted for the line sensor 22, and an area sensor drive circuit is substituted for the line sensor drive circuit 15.

The CPU 10 drives the light source drive circuit 19 and the area sensor drive circuit 15 in order for the area sensor 22 to read the image. Image signals output from the area sensor 22 are input to the CPU 10 through the signal processing circuit 16 and the amplifier 28. The CPU 10 manipulates the electronic volume (EVR) of the amplifier 28 to set four different amplitudes corresponding to a single reading condition.

For example, the CPU 10 sets an amplitude A, which corresponds to condition A, for amplifier 28. The image signal, corresponding to a horizontal transfer line of line 4n+1 (n=0, 1, 2, 3), and output from the area sensor 22, is amplified by amplitude A by the amplifier 28, and is received by the CPU 10 through the A/D converter 17.

Then, the CPU 10 sets the amplifier 28 with an amplitude B corresponding to condition A during the period in which the image signal is blank. The image signal, corresponding to a horizontal transfer line of line 4n+2, and output from the area sensor 22, is amplified by amplitude B by the amplifier 28, and is received by the CPU 10 through the A/D converter 17.

Subsequently, the CPU 10 sets the amplifier 28 with an amplitude C corresponding to condition A during the period in which the image signal is blank. The image signal, corresponding to a horizontal transfer line of line 4n+3, and output from area sensor 22 is amplified by amplitude C by the amplifier 28, and is received by the CPU 10 through the A/D converter 17. Subsequently, the CPU 10 sets the amplifier 28 with an amplitude D corresponding to condition A during the period in which the image signal is blank. The image signal, corresponding to a horizontal transfer line of line 4n+4, output from the area sensor 22, is amplified by amplitude D by the amplifier 28, and is received by the CPU 10 through the A/D converter 17.

As described above, the image data modified for four different levels of brightness can be obtained by processing each output of the area sensor 22 under four different reading conditions, reading conditions A, B, C and D. Thus, even when the image data is read by the line sensor 22, the image data modified for four different levels of brightness is also attainable by changing, likewise, the amplitude of the image signal for each line for four different levels.

Figure 14:
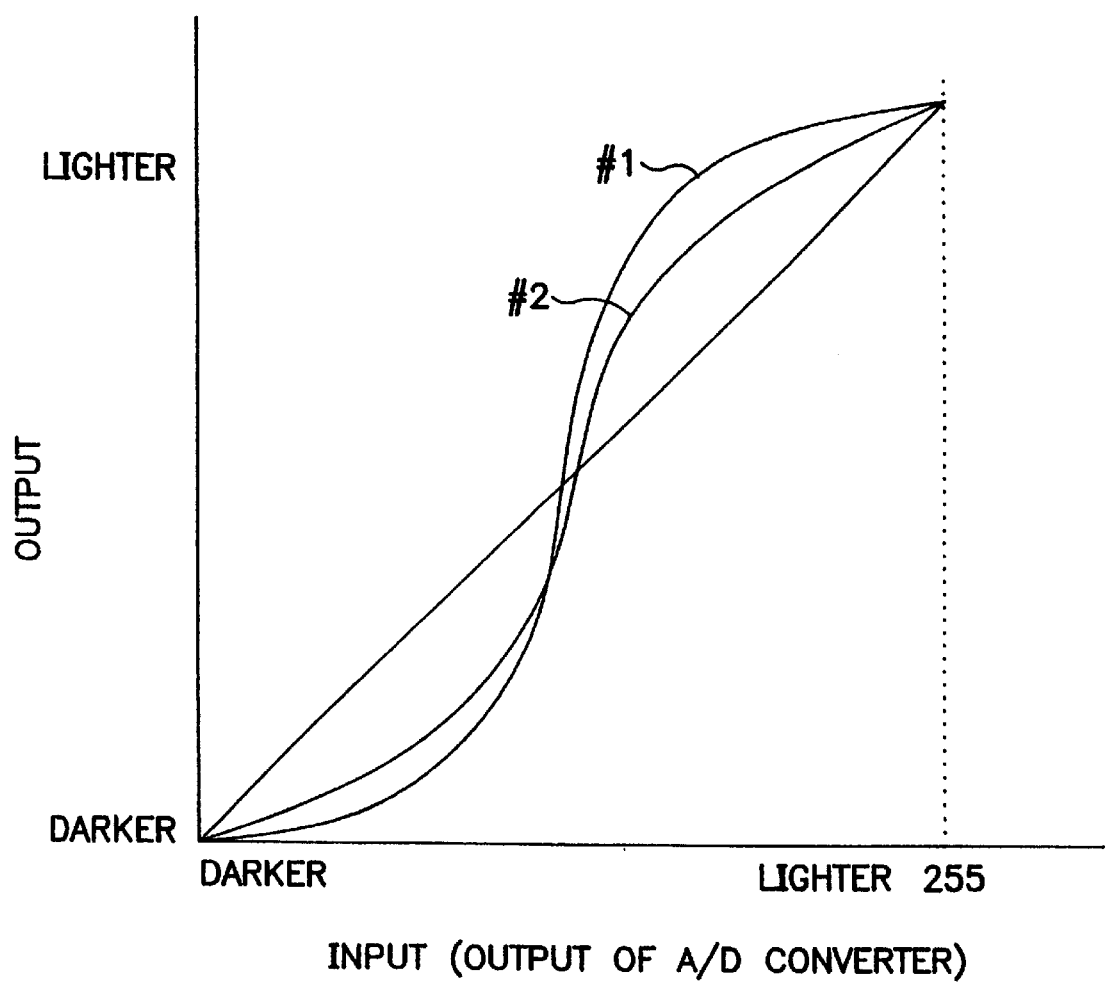
FIG. 14 is a diagram illustrating the changes in the contrast in a plurality of levels in accordance with the embodiments of the present invention.

Next, an example of modifying the contrast will now be described below with reference to FIG. 14. FIG. 14 is an explanatory diagram illustrating modification of the contrast for a plurality of levels by using the plurality of contrast adjustment tables. In the case of modifying the contrast, either the amplifier 28 is omitted, or the amplifier 28 is set at a constant amplitude, and the output of the A/D converter 17 is provided to the LUT circuit 18.

The CPU 10 selects one of characteristic #1 or #2, as shown in FIG. 14, depending on the requested level of contrast. The output of the LUT circuit 18 appears much darker if the input of the contrast level is dark; however, the degree of darkness is modified according to characteristics #1 and #2.

Figure 15:
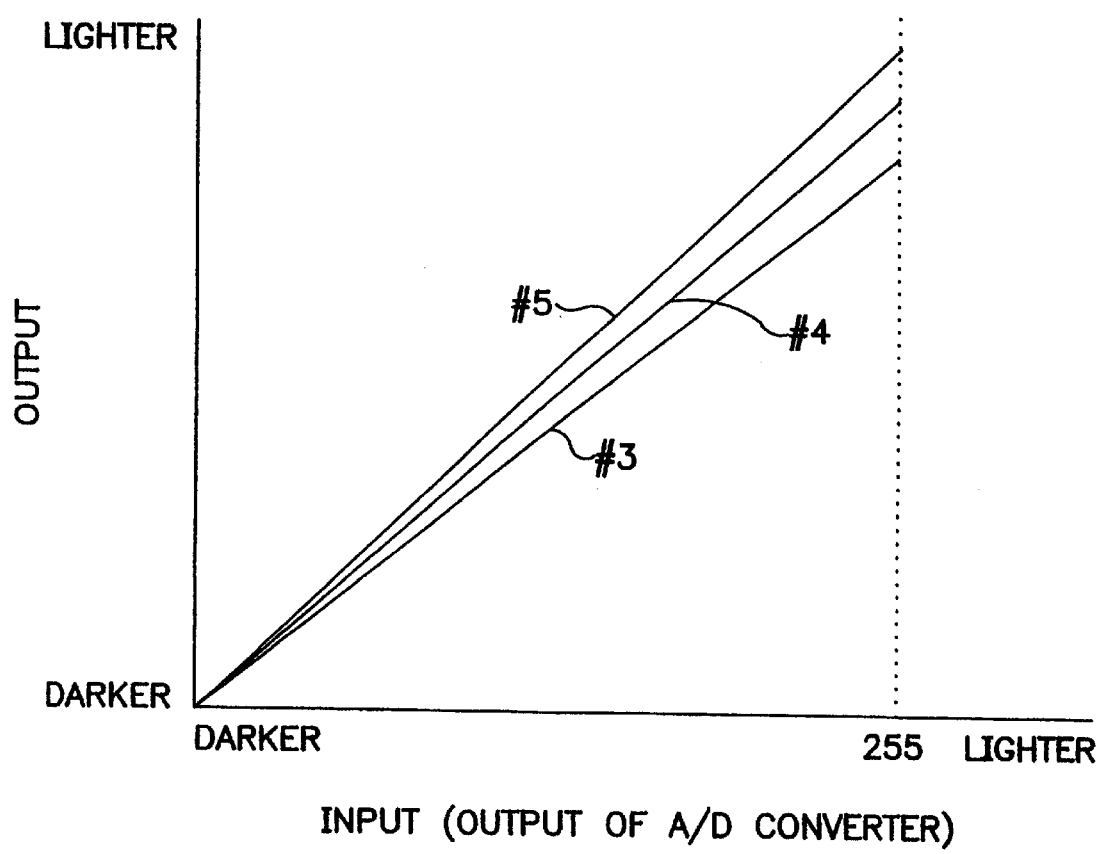
FIG. 15 is a diagram illustrating the changes in the gamma value in a plurality of levels in accordance with the embodiments of the present invention.

FIG. 15 is an explanatory diagram illustrating modification of the gamma value for a plurality of levels. In the case of modifying the gamma value, either the amplifier 28 is omitted, or the amplifier 28 is set at a constant amplitude, and the output of the A/D converter 17 is provided to the LUT circuit 18.

The CPU 10 selects one of characteristics #3, or #4, or #5, as shown in FIG. 15, depending on the requested gamma value. An entered illuminance value has been compensated for by a gamma value, appearing as an output of the LUT circuit 18; however, the degree of illuminance is modified according to selected characteristics #3, #4 or #5. Further, it is noted that although characteristics illustrated in FIG. 15 are straight lines, in order to facilitate an explanation, the characteristics shown in FIG. 15 may be represented with a curved graph as well.

In accordance with embodiments of the present invention, the modifications in the above-described examples are made on the scanner side; however, the modifications can be performed on the host computer 30 side through a similar method.

Either the host computer 30 or the scanner can perform the operations by which the balance of the plurality of colors is varied at a plurality of levels, or the chromaticity of a single color is varied at a plurality of levels. In the case of the scanner varying the balance of colors or the chromaticity of a single color, the emphasis for R (red), G (green), and B (blue) is adjusted by controlling the light source 20. A specified single color can also be adjusted in the same manner.

In accordance with the above-described embodiments of the invention, an explanation is provided of reading an image using the line sensor 22 in which a plurality of photoelectric conversion sections are arranged in a row. The above explanation also applies to the case of reading the image using an area sensor in which a plurality of photoelectric conversion sections are arranged in rows and columns. The image reading process by the area sensor can be performed either by the host computer 30 or the scanner.

When the image is read by an area sensor and the processing is performed by the host computer 30, the host computer 30 receives from the film image reading device data corresponding to the output of the plurality of photoelectric conversion sections arranged in rows and columns and stores them in an internal memory. More specifically, the data that has been divided into rows and columns is stored in the internal memory with corresponding addresses, as shown in FIG. 10 or FIG. 11.

The host computer 30 then specifies and reads the address storing the pixel data under reading condition A from the internal memory, and arranges the data in rows and columns, as shown in FIG. 9A, to generate the image data processed under reading condition A, in the same manner as described hereinabove. Similarly, the host computer 30 specifies and reads the address storing the pixel data under reading condition B from the internal memory, and arranges the data in rows and columns, as shown in FIG. 9B, to generate the image data processed under reading condition B, in the same manner as described hereinabove. Moreover, the host computer 30 specifies and reads the address storing the pixel data under reading condition C from the internal memory, and arranges the data in rows and columns, as shown in FIG. 9C, to generate the image data processed under reading condition C, in the same manner as described hereinabove. Similarly, the host computer 30 specifies and reads the address storing the pixel data under reading condition D from the internal memory, and arranges the data in rows and columns, as shown in FIG. 9D, to generate the image data processed under reading condition D, in the same manner as described hereinabove.

The host computer 30 displays, on the monitor screen 2a, the image corresponding to the image data processed under reading conditions A, B, C and D in the same manner as described hereinabove.

In the case that the image reading process of the area sensor is performed by the scanner, a memory with sufficient capacity for one screen is used as the memory 11. The output signals from the area sensor 22 having a plurality of photoelectric conversion sections arranged in rows and columns are digitized by the A/D converter 17 and are stored in the memory 11. Consequently, the memory 11 stores the data that has been divided into rows and columns, with corresponding addresses, as shown in FIG. 7 or FIG. 8, in the same manner as described hereinabove.

Then, the CPU 10 specifies and reads from the memory 11 the address storing the pixel data under reading condition A for one screen, and outputs the data to the host computer 30. The host computer 30 arranges the received pixel data under reading condition A in rows and columns, as shown in FIG. 9A, to generate the image data processed under reading condition A in the same manner described hereinabove.

Furthermore, the CPU 10 specifies and reads from memory 11 the address storing the pixel data under reading condition B for one screen, and outputs the data to host computer 30. The host computer 30 arranges the received pixel data under reading condition B in rows and columns, as shown in FIG. 9B, to generate the image data processed under reading condition B, in the same manner as described above.

Similarly, the CPU 10 specifies and reads from the memory 11 the address storing the pixel data under reading condition C for one screen, and outputs the data to the host computer 30. The host computer 30 arranges the received pixel data under reading condition C in rows and columns, as shown in FIG. 9C, to generate the image data processed under reading condition C, in the same manner as described above.

Finally, the CPU 10 specifies and reads from the memory 11 the address storing the pixel data under reading condition D for one screen, and outputs the data to the host computer 30. The host computer 30 arranges the received pixel data under reading condition D in rows and columns, as shown in FIG. 9D, to generate the image data processed under reading condition D, in the same manner as described above.

The host computer 30 displays on the monitor screen 2a the image corresponding to the image data processed under reading conditions A, B, C and D in the same manner as described above.

The above-described embodiment is also applicable to images generated by the main scanning. More particularly, in the case of images generated by the main scanning, a scanner reads the image under a plurality of conditions with the highest resolution for each line, and outputs the read images to the host computer 30 without skipping. The scanner then reads the image under a plurality of conditions with the highest resolution again, then repeats these processes. In this manner, the final scanned image developed under a plurality of conditions is achieved in high resolution although the rearrangement of the pixel data is done by the host computer 30.

In accordance with the above-described embodiments of the present invention, the control programs for the central processing unit of the host computer 30 are stored in the hard disk drive, which serves as a memory medium. Further, the processes associated with the operational processes illustrated in the flowcharts of FIGS. 12 and 13, and that are to be stored on the hard disk, are stored in the memory medium 30a, such as a CD-ROM, so that these processes can be set up on the host computer 30.

In accordance with the present invention, the CPU 10 of the image reading apparatus may be used in place of the central processing unit of the host computer 30. Further, the memory 11 in the image reading apparatus may be used in place of the memory of the host computer 30. In this case, the processes associated with the operational processes shown in the flowcharts of FIG. 12 and FIG. 13 may be stored in ROM program memory). Then, the CPU 10 of the image reading apparatus can execute operational processes by reading a program stored in ROM to the memory (working memory).

In accordance with the embodiments of the present invention described above, the image reading system of the present invention can display a plurality of types of images for the same document with a single setting manipulation by a user, thereby enabling the capability to easily obtain a desired image.

Further, in accordance with embodiments of the present invention, since the image reading system outputs image data read under varied reading conditions with a single reading operation, the load of image processing on the external devices can be greatly reduced.

Furthermore, in accordance with embodiments of the present invention, a memory medium stores the control procedures for performing operational processes of the image reading system and image reading apparatus.

Although a few preferred embodiments of the invention have been shown and described, it will be appreciated by those skilled in the art that changes may be made in these embodiments, without departing from the principles and the spirit of the invention, the scope of which is defined in the appended claims and their equivalents.

What is claimed is:

1. An image reading system, comprising:
   an image reading device to read an image on a document, wherein the image reading device divides the image into a plurality of areas including a first area and a second area, reads the first and second areas during a single scan of the document, and outputs image signals respectively corresponding to the first and second areas;
   a reading condition input device to set a first image reading condition and a second image reading condition, the first image reading condition being different from the second image reading condition;
   an image processing device to convert an image signal corresponding to the first area into a first image signal based on the first image reading condition, and to convert an image signal corresponding to the second area into a second image signal based on the second image reading condition; and a display device to display images respectively corresponding to the first image signal and the second image signal.

2. An image reading system as recited in claim 1, wherein the image reading device comprises:

a line sensor including a plurality of photoelectric conversion sections arranged in a row in a main scanning direction; and a moving device to move at least one of the line sensor and the document relative to the other in a secondary scanning direction crossing the main scanning direction, wherein the image reading device reads the image of the document by dividing the image into a plurality of areas to be read in the main scanning direction according to the plurality of photoelectric conversion sections and in the secondary scanning direction by the moving device in a sequential manner.

3. An image reading system as recited in claim 2, wherein the first area comprises a plurality of reading areas at specified intervals in the main scanning direction and a plurality of reading areas at specified intervals in the secondary scanning direction, and the second area is different from the first area and comprises a plurality of reading areas at specified intervals in the main scanning direction and a plurality of reading areas at specified intervals in the secondary scanning direction.

4. An image reading system as recited in claim 3, wherein the first and second areas correspond to pixels arranged at specified intervals in the main scanning direction of the line sensor.

5. An image reading system as recited in claim 4, wherein the specified interval in the main scanning direction is equal to the specified interval in the secondary scanning direction.

6. An image reading system as recited in claim 1, wherein the image reading device comprises:

an area sensor including a plurality of photoelectric conversion sections arranged in rows and columns, and the image of the document is read by dividing the image into a plurality of areas corresponding to the plurality of photoelectric conversion sections.

7. An image reading system as recited in claim 6, wherein the first area comprises a row of reading areas at specified intervals of a plurality of photoelectric conversion sections arranged in the rows and columns, and the second area is different from the first area and comprises rows of reading areas at specified intervals of the plurality of photoelectric conversion sections arranged in the rows and columns.

8. An image reading system as recited in claim 1, wherein the image processing device is a gradation conversion process device to convert a gradation based on the first image reading condition or the second image reading condition.

9. An image reading system as recited in claim 8, wherein the gradation conversion process device comprises:

a memory to store a plurality of gamma values, and the gradation conversion process device performs a conversion process for the first image reading condition by reading a first gamma value from the memory, and performs a conversion process for the second image reading condition by reading a second gamma value from the memory.

10. An image reading system as recited in claim 8, wherein the gradation conversion process device comprises:

a memory to store a plurality of contrast characteristic values, and the gradation conversion process device performs a conversion process for the first image reading condition by reading a first contrast characteristic value from the memory and performs a conversion process for the second image reading condition by reading a second contrast characteristic value from the memory.

11. An image reading system as recited in claim 8, wherein the image reading device comprises:

an amplifying device to amplify the image signal read by the image reading device, and the gradation conversion process device drives the amplifying device at a first amplification level based on the first image reading condition, and drives the amplifying device at a second amplification level based on the second image reading condition.

12. An image reading system as recited in claim 1, wherein the image reading device comprises:

a color separation device to separate colors in the image of the document, and the image processing device performs a color balancing process, based on the first image reading condition and the second image reading condition, for the image signals output by the image reading device corresponding to the image for which colors have been separated by the color separation device.

13. An image reading system as recited in claim 1, wherein the display device comprises a display control device to display the images, side by side, based on the first image signal and the second image signal.

14. An image reading system as recited in claim 1, wherein the display device interchangeably displays the images based on the first and second image signals.

15. An image reading system, comprising:

an image reading device to read an image of a document, wherein the image reading device divides the image into a plurality of areas including a first area and a second area, reads the first and second areas during a single scan of the document, and outputs image signals respectively corresponding to the plurality of areas;

a reading condition input device to set a first image reading condition and a second image reading condition for reading the image, the first image reading condition being different from the second image reading condition;

a control device to control the image reading device based on the first image reading condition to output a first image signal corresponding to the first area, and to control the image reading device based on the second image reading condition to output a second image signal corresponding to the second area; and a display device to display images respectively corresponding to the first and second image signals.

16. An image reading system as recited in claim 15, wherein the image reading device comprises:

a line sensor including a plurality of photoelectric conversion sections arranged in a row in a main scanning direction; and a moving device to move at least one of the line sensor and the document relative to the other in a secondary scanning direction crossing the main scanning direction, wherein the image reading device reads the image of the document by dividing the image into a plurality of areas to be read in the main scanning direction according to the plurality of photoelectric conversion sections and in the secondary scanning direction according to the moving device in a sequential manner.

17. An image reading system as recited in claim 16, wherein the first area comprises a plurality of reading areas at specified intervals in the main scanning direction and a plurality of reading areas at specified intervals in the secondary scanning direction, and the second area is different from the first area and comprises a plurality of reading areas at specified intervals in the main scanning direction and a plurality of reading areas at specified intervals in the secondary scanning direction.

18. An image reading system as recited in claim 17, wherein the first and second areas correspond to pixels arranged at specified intervals in the main scanning direction of the line sensor.

19. An image reading system as recited in claim 18, wherein the specified interval in the main scanning direction of the line sensor is equal to the specified intervals in the secondary scanning direction.

20. An image reading system as recited in claim 15, wherein the control device comprises a gradation conversion control device to control the conversion of gradations based on the first image reading condition or the second image reading condition.

21. An image reading system as recited in claim 15, wherein the image reading device comprises:

an area sensor having a plurality of photoelectric conversion sections arranged in rows and columns, and the image reading device reads the image of the document by dividing the image into a plurality of areas corresponding to the plurality of photoelectric conversion sections.

22. An image reading system as recited in claim 21, wherein the first area comprises rows of reading areas at specified intervals of the plurality of photoelectric conversion sections arranged in the rows and columns, and the second area is different from the first area and comprises rows of reading areas at specified intervals of the plurality of photoelectric conversion sections arranged in the rows and columns.

23. An image reading system as recited in claim 15, wherein the image reading device comprises:

a color separation device to separate colors in the image of the document, and the control device controls color balancing based on the first image reading condition and the second image reading condition.

24. An image reading system as recited in claim 15, wherein the display device includes a display control device to display, side by side, the images based on the first and second image signals.

25. An image reading system as recited in claim 15, wherein the display device includes a display control device to interchangeably display the images based on the first and second image signals.

26. An image reading system, comprising:

an image reading device to read an image on a document, wherein the image reading device divides the image into a plurality of areas reads the respective areas during a single scan of the document, and outputs image signals respectively corresponding to the plurality of areas;

a reading condition input device to set a first image reading condition and a second image reading condition, the first image reading condition being different from the second image reading condition;

an image processing device to convert an image signal corresponding to a specified area into a first image signal based on the first image reading condition and to convert an image signal corresponding to the specified area into a second image signal based on the second image reading condition; and a display device to display, side by side, images respectively corresponding to the first image signal and the second image signal.

27. An image reading apparatus, comprising:

an image reading device to read an image on a document, wherein the image reading device divides the document into a plurality of areas including a first area and a second area, reads the first and second areas during a single scan of the document, and outputs image signals respectively corresponding to the first and second areas;

a reading condition input device to set a first image reading condition and a second image reading condition, the first image reading condition being different from the second image reading condition;

an image processing device to convert an image signal corresponding to the first area into a first image signal based on the first image reading condition, and to convert an image signal corresponding to the second area into a second image signal based on the second image reading condition; and an output device to output the first and second image signals to external devices.

28. An image reading apparatus, comprising:

an image reading device to read an image on a document, wherein the image reading device divides the image into a plurality of areas including a first area and a second area, reads the first and second areas during a single scan of the document, and outputs image signals corresponding to the plurality of areas;

a reading condition input device to set a first image reading condition and a second image reading condition, the first image reading condition being different from the second image reading condition;

a control device to control the image reading device based on the first image reading condition to output a first image signal corresponding to the first area and to control the image reading device based on the second image reading condition to output a second image signal corresponding to the second area; and an output device to output respective images, based on the first and second image signals, to external devices.

29. An image reading system, comprising:

an image reading device to read an image of a document by dividing the image into a plurality of areas and to output image signals corresponding to the plurality of areas, the image reading device comprising:

a line sensor including a plurality of photoelectric conversion sections arranged in a row in a main scanning direction, and a moving device to move at least one of the line sensor and the document relative to the other in a secondary scanning direction crossing the main scanning direction;

a reading condition input device to set a first image reading condition and a second image reading condition for reading the image;

a control device to control the image reading device based on the first image reading condition to output a first image signal corresponding to a first area among the plurality of areas, and to control the image reading device based on the second image reading condition to output a second image signal corresponding to a second area among the plurality of areas, the control device comprising a gradation conversion control device to control the conversion of gradations based on the first image reading condition or the second image reading condition; and a display device to display images based on the first and second image signals respectively, wherein the gradation conversion control device drives the plurality of photoelectric conversion sections at a first image accumulation time based on the first image reading condition, and drives the plurality of photoelectric conversion sections at a second image accumulation time based on the second image reading condition.

30. An image reading system, comprising:

an image reading device to read an image of a document by dividing the image into a plurality of areas and to output image signals corresponding to the plurality of areas, the image reading device comprising a lighting device to light the document;

a reading condition input device to set a first image reading condition and a second image reading condition for reading the image;

a control device to control the image reading device based on the first image reading condition to output a first image signal corresponding to a first area among the plurality of areas, and to control the image reading device based on the second image reading condition to output a second image signal corresponding to a second area among the plurality of areas, the control device comprising a gradation conversion control device to control the conversion of gradations based on the first image reading condition or the second image reading condition, wherein the gradation conversion control device drives the lighting device at a first lighting time based on the first image reading condition, and drives the lighting device at a second lighting time based on the second image reading condition; and a display device to display images based on the first and second image signals respectively.

31. An image reading system, comprising:

an image reading device to read an image on a document by dividing the image into a plurality of areas and to output image signals corresponding to the plurality of areas, the image reading device comprising;

a line sensor including a plurality of photoelectric conversion sections arranged in a row in a main scanning direction; and a moving device to move at least one of the line sensor and the document relative to the other in a secondary scanning direction crossing the main scanning direction, wherein the image reading device reads the image of the document by dividing the image into a plurality of areas to be read in the main scanning direction according to the plurality of photoelectric conversion sections and in the secondary scanning direction by the moving device in a sequential manner, a reading condition input device to set a first image reading condition and a second image reading condition;

an image processing device to convert an image signal corresponding to a first area, among the plurality of areas, into a first image signal based on the first image reading condition, and to convert an image signal corresponding to a second area into a second image signal based on the second image reading condition, the first area comprising a plurality of reading areas at specified intervals in the main scanning direction and a plurality of reading areas at specified intervals in the secondary scanning direction, and the second area is different from the first area and comprises a plurality of reading areas at specified intervals in the main scanning direction and a plurality of reading areas at specified intervals in the secondary scanning direction; and a display device to display images based on the first image signal and the second image signal.

32. An image reading system as recited in claim 31, wherein the first and second areas correspond to pixels arranged at specified intervals in the main scanning direction of the line sensor.

33. An image reading system as recited in claim 32, wherein the specified interval in the main scanning direction is equal to the specified interval in the secondary scanning direction.

34. An image reading system, comprising:

an image reading device to read an image of a document by dividing the image into a plurality of areas and to output image signals corresponding to the plurality of areas, the image reading device comprising;

a line sensor including a plurality of photoelectric conversion sections arranged in a row in a main scanning direction, and a moving device to move at least one of the line sensor and the document relative to the other in a secondary scanning direction crossing the main scanning direction, wherein the image reading device reads the image of the document by dividing the image into a plurality of areas to be read in the main scanning direction according to the plurality of photoelectric conversion sections and in the secondary scanning direction according to the moving device in a sequential manner;

a reading condition input device to set a first image reading condition and a second image reading condition for reading the image;

a control device to control the image reading device based on the first image reading condition to output a first image signal corresponding to a first area among the plurality of areas, and to control the image reading device based on the second image reading condition to output a second image signal corresponding to a second area among the plurality of areas, the first area comprises a plurality of reading areas at specified intervals in the main scanning direction and a plurality of reading areas at specified intervals in the secondary scanning direction, and the second area is different from the first area and comprises a plurality of reading areas at specified intervals in the main scanning direction and a plurality of reading areas at specified intervals in the secondary scanning direction; and a display device to display images based on the first and second image signals, respectively.

35. An image reading system as recited in claim 34, wherein the first and second areas correspond to pixels arranged at specified intervals in the main scanning direction of the line sensor.

36. An image reading system as recited in claim 35, wherein the specified interval in the main scanning direction of the line sensor is equal to the specified intervals in the secondary scanning direction.

* * * * *